(12) United States Patent
Chavez et al.

(10) Patent No.: US 9,985,984 B1
(45) Date of Patent: May 29, 2018

(54) DYNAMIC DEFENSE AND NETWORK RANDOMIZATION FOR COMPUTER SYSTEMS

(71) Applicant: National Technology & Engineering Solutions of Sandia, LLC, Albuquerque, NM (US)

(72) Inventors: Adrian R. Chavez, Albuquerque, NM (US); William M. S. Stout, Albuquerque, NM (US); Jason R. Hamlet, Albuquerque, NM (US); Erik James Lee, Jackson, MO (US); Mitchell Tyler Martin, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 288 days.

(21) Appl. No.: 14/923,049

(22) Filed: Oct. 26, 2015

Related U.S. Application Data

(60) Provisional application No. 62/069,128, filed on Oct. 27, 2014.

(51) Int. Cl.
  *H04L 29/06* (2006.01)
  *G06F 21/00* (2013.01)
  (Continued)

(52) U.S. Cl.
  CPC .......... *H04L 63/1441* (2013.01); *G05B 19/05* (2013.01); *G06N 99/005* (2013.01);
  (Continued)

(58) Field of Classification Search
  CPC ............. H04L 63/1441; H04L 61/2503; H04L 63/1425; H04L 67/327; H04L 63/0272;
  (Continued)

(56) References Cited

U.S. PATENT DOCUMENTS 7,434,254 B1 * 10/2008 Foschiano ......... H04L 29/12028
  713/153
8,332,464 B2 * 12/2012 Dispensa .......... H04L 29/12009
  709/203

(Continued)

OTHER PUBLICATIONS

Y. Yang et al, Multiattribute SCADA—Specific Intrusion Detection System for Power Networks, IEEE, 2014.*

(Continued)

*Primary Examiner* — Shanto M Abedin
(74) *Attorney, Agent, or Firm* — Medley, Behrens & Lewis, LLC

(57) ABSTRACT

The various technologies presented herein relate to determining a network attack is taking place, and further to adjust one or more network parameters such that the network becomes dynamically configured. A plurality of machine learning algorithms are configured to recognize an active attack pattern. Notification of the attack can be generated, and knowledge gained from the detected attack pattern can be utilized to improve the knowledge of the algorithms to detect a subsequent attack vector(s). Further, network settings and application communications can be dynamically randomized, wherein artificial diversity converts control systems into moving targets that help mitigate the early reconnaissance stages of an attack. An attack(s) based upon a known static address(es) of a critical infrastructure network device(s) can be mitigated by the dynamic randomization. Network parameters that can be randomized include IP addresses, application port numbers, paths data packets navigate through the network, application randomization, etc.

18 Claims, 13 Drawing Sheets

(51) Int. Cl.
  *G06F 11/00* (2006.01)
  *H04N 7/16* (2011.01)
  *H04L 29/08* (2006.01)
  *H04L 29/12* (2006.01)
  *G05B 19/05* (2006.01)
  *G06N 99/00* (2010.01)

(52) U.S. Cl.
  CPC ...... *H04L 61/2503* (2013.01); *H04L 63/1425* (2013.01); *H04L 67/327* (2013.01); *G05B 2219/1105* (2013.01); *H04L 67/10* (2013.01)

(58) Field of Classification Search
  CPC ...... G05B 19/05; G06N 99/005; G06F 21/56; G06F 21/60
  USPC ..................................... 726/1, 11–13, 22–25
  See application file for complete search history.

(56) References Cited

U.S. PATENT DOCUMENTS

| | | | | |
|---|---|---|---|---|
| 8,464,334 | B1* | 6/2013 | Singhal | H04L 63/0414 726/13 |
| 2005/0021740 | A1* | 1/2005 | Bar | H04L 63/0236 709/224 |
| 2005/0257099 | A1* | 11/2005 | Bounkong | G06T 1/005 714/48 |
| 2007/0157306 | A1* | 7/2007 | Elrod | H04L 63/0227 726/14 |
| 2013/0198803 | A1* | 8/2013 | Osterweil | H04L 63/0236 726/1 |
| 2013/0294446 | A1* | 11/2013 | Smith | H04L 63/0414 370/389 |
| 2014/0075519 | A1* | 3/2014 | Porras | H04L 63/20 726/4 |
| 2014/0280992 | A1* | 9/2014 | Khan | H04L 69/40 709/228 |
| 2014/0325651 | A1* | 10/2014 | Kim | H04L 63/1466 726/23 |
| 2016/0105471 | A1* | 4/2016 | Nunes | H04L 12/4633 709/228 |
| 2016/0269363 | A1* | 9/2016 | Southerland | G05B 19/054 |

OTHER PUBLICATIONS

S. Antonatos et al, Defending against hitlist worms using network address space randomization, Elsevier B. V., 2007.*

Wei Lin Guay et al, Host Side Dynamic Reconfiguration with InfiniBand, IEEE, 2010.*

Kishimoto et al. "Improving Performance of Anomaly-based Isa by Combining Multiple Classifiers", Applications and the Internet (SAINT), 2011 IEEE/IPSJ 11th International Symposium, 2011, pp. 366-371.

Symons, et al., "Nonparametric Semi-Supervised Learning for Network Intrusion Detection: Combining Performance Improvements with Realistic In-Situ Training", Proceedings of the 5th ACM Workshop on Security and Artificial Intelligence, ACM, 2012, pp. 1-11.

Spangler, Ryan, "Packet Sniffing on Layer 2 Switched Local Area Networks", Packetwatch Research, Dec. 2003, pp. 1-5.

Venkatramulu, et al., "Various Solutions for Address Resolution Protocol Spoofing Attacks", International Journal of Scientific and Research Publications, vol. 3, Issue 7, Jul. 2013, pp. 1-12.

* cited by examiner

DYNAMIC DEFENSE AND NETWORK RANDOMIZATION FOR COMPUTER SYSTEMS

RELATED APPLICATION

This application claims priority to U.S. Provisional Patent Application No. 62/069,128, filed on Oct. 27, 2014, and entitled "DYNAMIC DEFENSE AND NETWORK RANDOMIZATION FOR COMPUTER SYSTEMS", the entirety of which is incorporated herein by reference.

STATEMENT OF GOVERNMENTAL INTEREST

This invention was developed under contract DE-AC04-94AL85000 between Sandia Corporation and the U.S. Department of Energy. The U.S. Government has certain rights in this invention.

BACKGROUND

Computer systems have found numerous applications in the industrial automation environment and are employed ubiquitously throughout, e.g., to control and/or monitor the operation of a process, machine, tool, device, and the like. To facilitate control of a process, etc., one or more controllers (e.g., a programmable logic controller (PLC)) are utilized with input/output (I/O) devices controlling operation of the process along with gathering process information (e.g., measurements, data, values, parameters, variables, metadata, etc.) pertaining to how the process is performing.

A plurality of computer systems can be operating at a single location, e.g., a power station, a nuclear power station, etc., to provide energy, resources, etc., wherein the plurality of computer systems can be operating on a local area network (e.g., a LAN, an intranet) communicatively coupled to the PLCs. However, such computer systems can often utilize unpatched systems (e.g., legacy systems and modern systems) which are amenable to cyberattack by a malicious entity. Further, while the local network can be configured and/or constructed to operate in a secure manner (e.g., password access, etc.), it is often desired that a remote, but authorized, entity is also able to access the locally-networked computer systems. For example, an organization can comprise a plurality of power stations located throughout a region, wherein the plurality of power stations are monitored, controlled, etc., by a central operations center (e.g., a business center, head office). Hence, while each power station in the plurality of power stations is operating on its own local network, data from a power station may be required by the central operations center, wherein the central operations center is in communication with each power station via a wide area network (e.g., a regional network, the internet, etc.). Operational instructions, request(s) for data, information, etc., can be transmitted between the central operations center and a power station via the Internet.

Further, various computer devices, etc., within a power plant may remain in operation for a long period of time (e.g., months, years), and the internet protocol (IP) address of a computer device within the intranet may remain unchanged for an extended period of time.

Hence, a malicious entity can utilize the internet to communicate an executable program to a power station, and further, with knowledge of an effectively static IP address, once the entity has gained access to the intranet, the entity can easily direct the executable program to the IP address of a device that is to undergo an attack. It is difficult to detect such an attack on a control system network, and/or devices included in the network (e.g., computers, PLCs, machines, etc.) until it is too late, e.g., the attack is already underway.

As highlighted by the STUXNET attack, discovered in June 2010, process control operations, and PLCs in particular, have become a focus for malicious attack, such as a computer worm, virus or other malware. As a generalized overview, the STUXNET attack involved a computer worm taking control of a PLC, the PLC was controlled to effect destruction of a component and/or apparatus while at the same time, the PLC was reporting that the component/apparatus was operating correctly.

SUMMARY

The following is a brief summary of subject matter that is described in greater detail herein. This summary is not intended to be limiting as to the scope of the claims.

The various technologies presented herein relate to determining whether a network and/or a host-based attack is taking place, and further, adjusting one or more network parameters such that the network becomes dynamically configured.

In an embodiment, a computing device on a wide area network (WAN) can generate a data packet, wherein the data packet is to be routed over a local area network (LAN) to a destination device. The WAN and the LAN can be communicatively coupled, with an edge router routing data packets therebetween. The LAN can be an industrial control network with a plurality of switches, controllers, host devices, machines, etc., located thereon. The WAN can be the Internet and has computing systems associated with the industrial control network located thereon and further an attack computer can also be located thereon. The attack computer can be utilized by a malicious entity to generate an attack on a device (e.g., a machine) in the LAN.

At least one computing device (e.g., a host, a controller, a router, a switch, an endpoint, a machine, etc.) on the LAN can comprise a data analyzer component, which is configured to analyze a data packet prior to the data packet being processed (e.g., executed) on a destination device communicatively coupled to the at least one computing device. The data analyzer can also be configured to monitor host system attributes and behaviors. The data analyzer can utilize a framework comprising a plurality of machine learning algorithms which are configured to recognize an active attack pattern.

In an embodiment, a computing device can generate the data packet, where the computing device is expected to be communicating with one or more devices in the LAN. The data analyzer component determines that the data packet is from a known source (e.g., a business computer requesting data from one or more devices on the industrial control LAN). Accordingly, the data analyzer component flags the data packet to be safe and the data packet is forwarded for processing at the destination device.

In another embodiment, a data packet can be generated by an attack computer that is not expected to be communicating with one or more devices in the LAN. A switch can receive a rule-set comprising a pair(s) of known good source-destination addresses), and based upon the rule-set, the switch can identify the data packet as originating from an unknown source; upon analysis of the data packet by the data analyzer component, the analyzer component can determine that the data packet may comprise code that can be utilized to attack the one or more devices (e.g., the destination device) in the LAN. Accordingly, the data analyzer component flags the data packet to be unsafe and the data packet is quarantined, or the switch drops the packet without forwarding on. In a further embodiment, the data analyzer component can detect other forms of malicious activity, such as unusual amounts of traffic across the LAN and/or at a particular device, any unexpected protocols being utilized (e.g., for a data packet, transmission, etc.), an unexpected process occurring at a device, an unexpected number of processes at a device, etc. The data analyzer can generate a flag indicating potential malicious activity has been detected.

In an embodiment, information generated from processing both safe data packets and attack data packets as well as safe and unsafe system behaviors can be reapplied to the framework, and the plurality of machine learning algorithms, to retrain the framework, thereby continuously improving the ability for the data analyzer component to recognize a subsequent attack vector(s).

Further, at least one computing device on the LAN can comprise a configuration component, where the configuration component can be utilized to dynamically randomize one or more network settings and application communications on the LAN. The dynamic randomization creates an artificial diversity that converts a control system(s) on the LAN into a moving target(s) that help mitigate an early reconnaissance stage of an attack. Network parameters that can be randomized include IP addresses, application port numbers, paths data packets navigate through the LAN, application randomization, etc. An attack(s) based upon a known static address(es) of a critical infrastructure network device(s) can be mitigated by the dynamic randomization.

For each device on the LAN, the configuration component can generate a configuration update, wherein the configuration update comprises an original network parameter (e.g., an original IP address applied to a device during initialization of the LAN) and an updated network parameter (e.g., a random value for an IP address, wherein the random IP address has the same format as the original IP address). The original network parameter and the updated network parameter can be paired and transmitted to one or more devices located on the LAN utilized in routing of one or more data packets across the LAN. At each device that routes data packets, the device can route data packets in accordance with the updated (random) IP addresses.

In an embodiment, when a data packet is received at a switch in the LAN, the switch can replace an original network parameter in the data packet with its paired updated network parameter. Upon updating the data packet, the switch can then forward the data packet to a destination device in the LAN having the original network parameter. In a further embodiment, any routing device on the LAN that receives the data packet can analyze the data packet, identify the updated network parameter, determine the original network parameter paired with the updated network parameter, and continue the routing of the data packet to the destination device. It is to be noted that during the randomized configuration updates, the original network parameter value remains constant and the updated network parameter has the randomized value. Accordingly, the destination device can always be determined based upon identifying a pairing between an updated network parameter in a data packet and its paired original network parameter value stored locally at a switch.

Hence, based upon the foregoing, if an attack computer has knowledge of the original network parameters, an attack data packet is unable to be routed across the LAN as data packet routing is based upon the updated network parameters.

In another embodiment, routing of a data packet can also be randomized. In an embodiment, a switch can receive a map of the network (e.g., received from a centralized device in the LAN that includes the centralized configuration component). Based upon the network map, the switch can generate a random route for routing of the data packet from the switch to the destination device. For example, a first data packet and a second data packet are both received at the switch and are to both be routed to the same destination device on the LAN. In a first situation, the switch routes the first data packet along a first route in the LAN to the destination device. In a second situation, the switch routes the second data packet along a second route in the LAN to the destination device, wherein the first route and second route are different.

Further, owing to the random routing of data packets across the LAN, the first data packet may take longer to arrive at the destination device than the second data packet, hence the random routing can cause latency in data packet routing across the LAN. Accordingly, a situation can occur where an intermediary switch has received a new parameter update from the configuration component, such that the updated network parameter in the data packet is no longer the same as the current updated network parameter being utilized at the intermediary switch. Upon analysis of the data packet at the intermediary switch, the intermediary switch determines that the value of the network parameter in the data packet is not the same as the current network parameter received from the configuration component. However, the intermediary switch can identify the time at which the network parameter in the data packet was updated, and if the time is within a defined latency duration (e.g., as defined by a latency setting), the intermediary switch can review previous updated network parameter and original parameter pairings to determine if the value of the network parameter in the data packet matches an updated network parameter received with the defined latency duration. If the network parameter in the data packet matches an updated network parameter previously received and stored at the intermediary switch, the data packet can be forwarded to the destination device having the original network parameter value.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
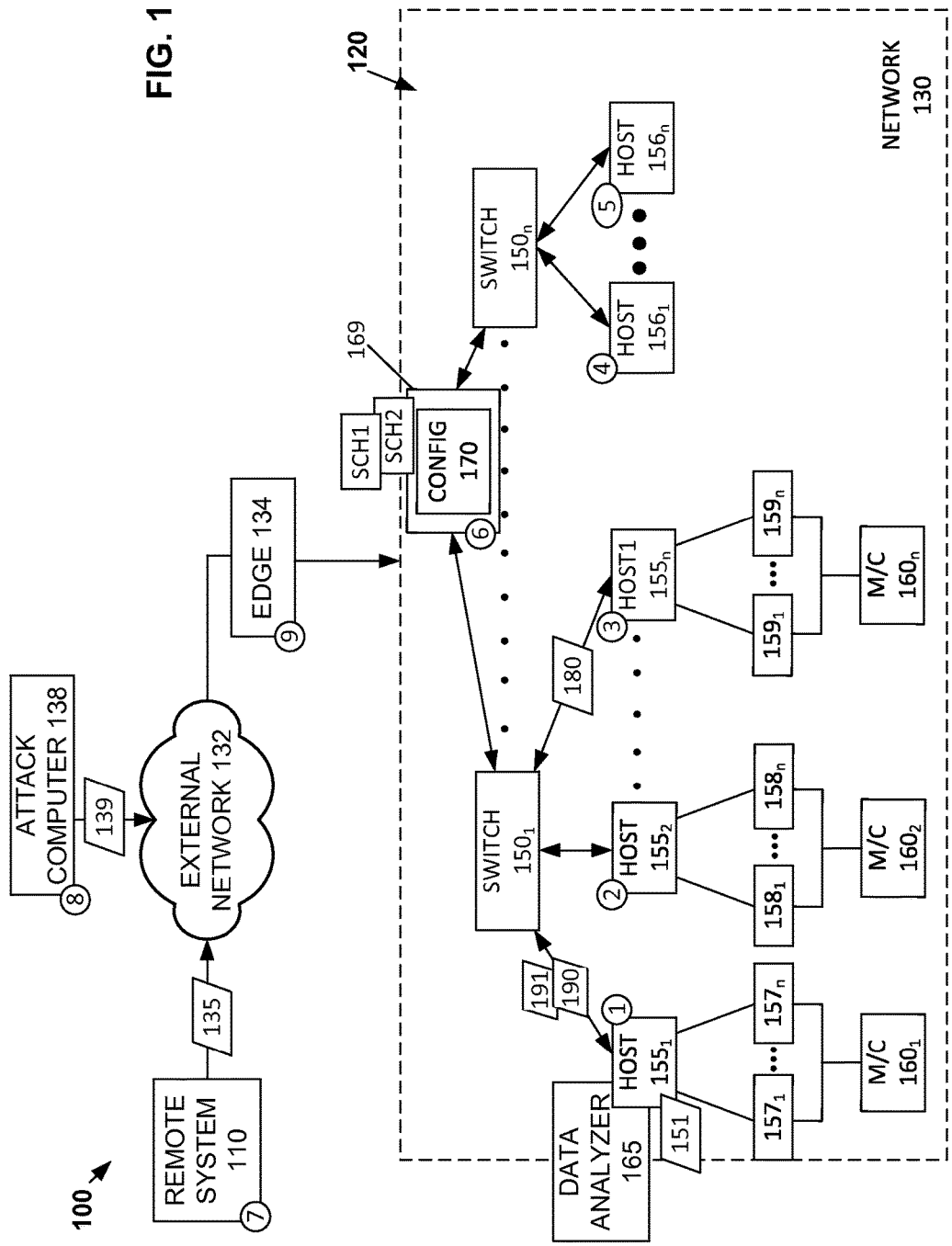
FIG. 1 is a block diagram illustrating exemplary embodiments for determining malicious activity on a network and dynamically configuring network components.

Various technologies pertaining to identifying a network attack and/or adjusting one or more network parameters to prevent determination by a malicious entity of a network parameter are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

As used herein, the terms "component", "device", and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. The terms "component", "device", and "system" are also intended to encompass hardware configured to cause certain functionality to be performed, where such hardware can include, but is not limited to including, Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

Further, the term "or" is intended to mean an inclusive "or" rather than an exclusive "or". That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. Additionally, as used herein, the term "exemplary" is intended to mean serving as an illustration or example of something, and is not intended to indicate a preference.

As previously mentioned, the static nature (e.g., static IP addressing) of various devices (and/or components) which form a local area network (LAN) renders the devices susceptible to an attack. In an example scenario, a malicious entity has previously determined an IP address of a device(s) and directs an attack at the device(s). Hence, while the static nature of the network devices renders the network amenable to monitoring, as expected and unexpected network activity can be easily detected, the static nature also renders the network susceptible to discovery of at least one parameter (e.g., IP address) pertaining to a device in the network by an adversary. The various embodiments presented herein relate to dynamically changing the network environment, and further, to detecting and classifying anomalous behavior at one or more devices and/or components of the network, e.g., at an edge router, a host device, an endpoint, a switch, a controller, a machine, etc. Parameters of the network (e.g., device IP addressing) can be dynamically changed in accordance with a defined schedule (e.g., at a defined time), a schedule utilizing random timings, based upon a determination that the network is undergoing an attack, etc. The network, and the devices located thereon, can be part of an industrial control system, e.g., a control system used in a power plant, an oil or gas refinery, etc. The industrial control system can include a plurality of switches, controllers, host devices, machines, etc., wherein a controller can be a programmable logic controller (PLC), however the various aspects presented herein relate to any controller including a programmable automation controller (PAC), a remote terminal/telemetry unit (RTU), etc.

FIG. 1 illustrates a process control configuration 100 for an industrial automation environment. In the exemplary embodiment presented in FIG. 1, a remotely-located computer system 110 (e.g., a centralized business system) is in communication with an industrial control system 120 that is operating on a local area network (LAN) 130 (e.g., a local network, an intranet, Ethernet, private network, an internal network, etc.), wherein the computer system 110 is communicating with the LAN 130 via a wide area network (WAN) 132 (e.g., the Internet, a regional network, a public network, an external network, etc.). Communication between the computer system 110 and one or more components and/or devices located on the LAN 130 can be via an edge router 134 (e.g., an edge server) located at the edge of the LAN 130.

A data packet(s) 135 can be communicated (e.g., transmitted) between the computer system 110 and the edge router 134, wherein the data packet 135 is configured to be processed by a device located in the LAN 130. The data packet 135 can comprise any suitable request, command, instruction, data, information, etc. For example, data packet 135 can include an instruction directed towards a particular machine, switch, node, etc., as further described herein. In an embodiment, the data packet 135 can be generated by an entity at the computer system 110, e.g., the data packet 135 includes a request for operational data for a machine located in the industrial control system 120. To facilitate execution of code in the data packet 135 at the desired device, the data packet 135 includes one or more parameters (e.g., an IP address) that identify the desired device(s) in the LAN 130. An IP address can be of any suitable configuration for distribution of data, etc., across the LAN 130, e.g., internet protocol version 4 (IPv4, e.g., 172.16.254.1), internet protocol version 6 (IPv6, e.g., 2001:db8:0:1234:0:567:8:1), etc.

However, in another embodiment, a malicious entity can be utilizing a computer, attack computer 138, which is also attempting to access the LAN 130 via the WAN 132. The malicious entity can generate a data packet 139, wherein the data packet 139 can comprise computer code that is to execute on a particular device located on the LAN 130. To facilitate execution of the code on the device, the data packet 139 includes one or more parameters (e.g., an IP address) that identify the device(s) in the LAN 130 that is to be attacked.

It is to be appreciated that while the various embodiments presented herein are directed towards randomizing the IP address of a device(s) included in the LAN 130, any parameter associated with the device(s) can be randomized. As well as IP address, other parameters which can dynamically randomized include source IP address, destination IP address, MAC source address, MAC destination address, application port number, etc.

As previously described, device IP addresses in conventional control systems tend to be static. Hence, the malicious entity may be able to discern the IP address of a device of interest based upon previously obtained knowledge, e.g., from a previous discovery attack, from details describing the LAN 130 and devices located thereon, etc. With the obtained IP address, executable code can be generated and targeted to the known IP address. The various embodiments presented herein, as further described, can be utilized to randomize one or more IP addresses to address issues with static IP addresses. Further, the respective data packets 135 and 139 can be analyzed to determine whether the data packet comprises a request from a known, authentic source (e.g., the remote system 110) or from a malicious entity (e.g., the computer 138).

As previously mentioned, the LAN 130 can have a plurality of devices located thereon. As shown, the LAN 130 can comprise switches $150_1$ to $150_n$, wherein n is an integer greater than 1. Each switch can be connected to a plurality of host devices, e.g., the first switch $150_1$ is connected to hosts $155_1$, $155_2$, $155_n$, and the switch $150_n$ is connected to the hosts $156_1$, $156_n$, etc. Each host can be respectively connected to one or more subcomponents, e.g., PLC's, for example, host $155_1$ is connected to PLCs $157_1$-$157_n$, host $155_2$ is connected to PLCs $158_1$-$158_n$, host $155_n$ is connected to PLCs $159_1$-$159_n$, etc. Each PLC can be configured to perform an action with regard to a machine connected to the PLC, wherein an action can be performing an operation, providing sensory feedback, making a measurement, etc. For example, PLCs $157_1$-$157_n$ are connected to machine $160_1$ and perform an action relating to one or more operations performed at or by machine $160_1$, PLCs $158_1$-$158_n$ are connected to machine $160_2$ and perform an action relating to one or more operations performed at or by machine $160_2$, and PLCs $159_1$-$159_n$ are connected to machine $160_n$ and perform an action relating to one or more operations performed at or by machine $160_n$. It is to be noted that while the subscript n is utilized to denote a plurality of similar devices, a value for n of a first device type does not have to be the same value as applied to n for a second device type. For example, in a given configuration there can be 7 PLCs 159 denoted PLCs $159_1$-$159_7$, while in the same configuration there can be 5 hosts 155, such that hosts are denoted hosts $155_{1-5}$, hence n=7 and n=5 respectively.

In an embodiment, where an industrial control system is implemented via the LAN 130, the hosts $155_1$-$155_n$, $156_1$-$156_n$ can be interfaces that facilitate operation of the respective PLCs $157_1$-$157_n$, $158_1$-$158_n$, $159_1$-$159_n$, and machines $160_1$-$160_n$, e.g., the hosts $156_1$-$156_n$ can be human machine interfaces (HMIs). Further, in a non-exhaustive listing, the hosts $155_{1-n}$, $156_{1-n}$, the PLCs $157_{1-n}$, $158_{1-n}$, $159_{1-n}$, machines $160_{1-n}$ can be any of an I/O device, a controller, a sensor, an interface, a human machine interface (HMI), a graphical user interface (GUI), a device, a machine, a tool, a motor, a component, software, etc., to facilitate performing at least one operation in the industrial automation environment.

A host (e.g., any of hosts $155_{1-n}$, $156_{1-n}$) can further include a data analyzer component 165, wherein the data analyzer component 165 component is configured to capture a data packet(s) arriving at the host and analyze the data packet(s) to determine whether the data packet comprises legitimate code or malicious code, and accordingly, whether the data packet's command or instruction can be forwarded to further devices in the LAN 130, or the data packet should be quarantined for further analysis (e.g., determination of whether a network attack is in progress). For example, in FIG. 1, a data analyzer component 165 is shown located at the host $155_1$, wherein the data analyzer component 165 can analyze a data packet (e.g., data packet 135 or 139) to determine whether it is safe to execute code in the data packet with respect to any of PLCs $157_1$-$157_n$, and/or machine $160_1$. In a further embodiment, with the data analyzer component 165 located at a host device, the data analyzer component 165 can also analyze a data packet that is generated at the host device, extract one or more features from a data packet, etc., to identify any unusual and/or malicious behavior occurring at a host in the network 130. For example, the data analyzer component 165 can analyze a data packet 151, wherein the data packet 151 can be generated by the host $155_1$, and the data packet 151 comprises data pertinent to any of the PLCs $157_1$-$157_n$. And further, the data packet 151 can comprise data generated by the host $155_1$ for execution at another device in the LAN 130 and/or the WAN 132, e.g., any of the $155_{2-n}$, $156_{1-n}$, the PLCs $157_{1-n}$, $158_{1-n}$, $159_{1-n}$, machines $160_{1-n}$, the switches $150_{1-n}$, the edge router 134, the remote system 110, the attack computer 138, etc. In an embodiment, the data analyzer component 165 can monitor operation of the host $155_1$, e.g., a statistical analysis such as number of processes being performed at the host, utilization of one or more devices or components (e.g., % utilization of central processing unit(s) (CPUs), % memory utilization, etc.), number of system calls, a sequence of results pertaining to one or more system calls, etc.

In a further embodiment, while FIG. 1 illustrates a host (e.g., the host $155_1$) as comprising the data analyzer component 165, other devices in the LAN 130 may comprise the data analyzer component 165 or the data analyzer component 165 may be distributed across numerous devices in the LAN. For example, while not shown, a data analyzer component 165 can be located at any of the switches $150_{1-n}$, hosts $155_{1-n}$, $156_{1-n}$, etc., to identify malicious data that may have been injected into the LAN 130 by a communication path other than the communication path on which the host (e.g., the host $155_1$) is located (e.g., the malicious data packet is loaded onto the host $156_n$ and is to propagate through the LAN 130 from there), or analyze the behaviors on the systems themselves to identify anomalies (which may presume malicious code execution or insider threat). In another embodiment, the data analyzer component 165 can be located on a device positioned between a host (e.g., any of hosts $155_{1-n}$, $156_{1-n}$) and a PLC (e.g., any of PLCs $157_{1-n}$, $158_{1-n}$, $159_{1-n}$), where the device is configured to monitor data packets being communicated therebetween. In a further embodiment, the data analyzer component 165 can be located at a PLC (e.g., any of PLCs 157$_{1-n}$, 158$_{1-n}$, 159$_{1-n}$) and is configured to monitor data packets being processed and/or generated at the PLC, as well as operation of the PLC, e.g., processor utilization, memory utilization, etc. In another embodiment, the data analyzer component 165 can be located at an endpoint in the local area network 130, e.g., at any of the machines 160$_{1-n}$, and is configured to monitor data packets being processed and/or generated at the endpoint, as well as operation of the endpoint device, e.g., processor utilization, memory utilization, etc. Further, in addition to determining whether a data packet includes malicious code, the data analyzer component 165 can also be configured to detect other forms of malicious activity, where such activity can include unusual amounts of traffic across the LAN 130 and/or at a particular device, any unexpected protocols being utilized (e.g., for a data packet, transmission, etc.), an unexpected process occurring at a device, an unexpected number of processes at a device, etc. The data analyzer can generate a flag indicating potential malicious activity has been detected, wherein the flag can be utilized to initiate randomization of one or more network settings, as further described.

Each device on the WAN 132 and within the LAN 130 can have a network parameter (e.g., an IP address) assigned thereto. For example, the hosts 155$_1$, 155$_2$, 155$_n$, 156$_1$ and 156$_n$ have respective IP addresses IP address 1 to IP address 5, the remote system 110 has an IP address 7, the attack computer 138 has an IP address 8, and the edge router 134 has an IP address 9. As previously mentioned, in a conventionally configured network, the IP addresses 1-9, once assigned to a particular device, can remain unchanged for an extensive period of time, and can be considered to be statically assigned. As further described herein, one or more of the IP addresses 1-9 can be reconfigured, where such reconfiguration can occur in accordance with a time schedule, at a random point in time (e.g., a random timing schedule), in response to determining that a malicious attack of one or more devices in the LAN 130 is occurring, an attack is to be attempted, where a determination that an attack may occur, etc. The IP address 7 of the remote computer 110, and the IP address 8 of the attack computer 138 can be utilized to determine where a data packet (e.g., data packets 135, 139) originated.

In an embodiment, the LAN 130 comprises a computing device 169 that includes a configuration component 170. The configuration component 170 is configured to assign a new IP address(es) to one or more of the devices in the LAN 130 (e.g., any of devices 155$_{1-n}$, 156$_{1-n}$, 157$_{1-n}$, 158$_{1-n}$, 159$_{1-n}$, 160$_{1-n}$, and/or the edge router 134). The configuration component 170 can operate in isolation or in conjunction with another device located in system 100. For example, the configuration component 170 can generate one or more configuration updates in response to data received from the edge router 134.

In an example embodiment, the configuration component 170, when executed by the computing device 169, can cause the computing device 169 to generate and distribute (transmit, communicate) a configuration update 180 (an instruction) to the one or more of the devices in the LAN 130, wherein the configuration update 180 can be generated in accordance with a schedule SCH1, wherein SCH1 has a fixed time defining when the configuration update 180 is to be generated and/or distributed. In another embodiment, the configuration component 170 can generate and distribute the configuration update 180 for the one or more of the devices in the LAN 130 in accordance with a schedule SCH2, wherein SCH2 has a random time defining when the configuration update 180 is to be generated and/or distributed.

In a further embodiment, the configuration component 170 can generate a configuration update 180 in response to a determination by the data analyzer component 165 that a data packet (e.g., data packet 139) has been received (e.g., from the attack computer 138), and the data packet 139 contains malicious code to be executed on one or more devices in the LAN 130, or in response to detecting any other anomalous activity, as previously described. The data analyzer component 165 determines that the malicious code included in the data packet includes an IP address of a particular device (e.g., host 155$_2$) and/or malicious activity is occurring, and accordingly, the data analyzer component 165 transmits an instruction 190 to the configuration component 170 to generate and distribute a configuration update 180.

The data packets 135 and 139, the configuration update 180, and the instruction 190, can be in any communication protocol/format, such as transmission control protocol (TCP), internet protocol (IP), a network protocol, a serial protocol, a parallel protocol, a hypertext transfer protocol (HTTP), an automation communication network protocol, common industrial protocol (CIP), a manufacturer specific protocol such as EtherNet/IP, Sinec H1, service request transport protocol (GE-SRTP), ControlNET, DeviceNET, peripheral component interconnect express (PCIe), RS-232, serial data interface (SDI-12), Modbus, etc.

As previously mentioned, the data analyzer component 165 can be located at a switch (e.g., any of the switches 150$_{1-n}$), wherein the configuration component 170 can generate one or more rule-sets 191 for the switch, wherein the rule-set(s) 191 facilitate (e.g., allow) transmission of data packets from known good source-destination pairs. The rule-set(s) 191 can be installed on the switch to enable the switch to determine whether to forward the data packet or not. For example, in a rule-set 191, computer 110 is defined as a known good-source IP address, and any of hosts 155$_{1-n}$, 156$_{1-n}$. are defined as good destination IP addresses. Accordingly, the switch can determine that the data packet 135 is from a known source, while the data packet 139 is not. In the case of data packet 139 not being included in the known good source-destination pairs, the switch can identity that the data packet 139 is from an unknown source and pass the data packet 139 to the data analyzer component 165 for analysis of whether the data packet 139 contains malicious code, or not. By implementing the rule-set(s) 191 on the switch, the switch can be considered to have been configured by the configuration component 170. A similar operation can be performed with the data analyzer component 165 located at the edge router 134.

To facilitate understanding of the various embodiments presented herein, the subsequent description is separated into two sections. The first section describes functionality of the data analyzer component 165 and determination of whether a data packet (e.g., data packets 135, 139) received at the data analyzer component 165 has been generated with malicious intent. The second section describes functionality of the configuration component 170 and the application of randomized network parameters (e.g., IP addresses) to one or more devices located in the LAN 130.

1. Analysis of a Data Packet(s)/Attack Detection

As described supra, it can be difficult to detect whether a data packet transmitted to a network constitutes an attack on the network until it is too late and the attack is already underway. To facilitate determination of whether a data packet includes a data request, or other information, generated by an authorized source (e.g., remote system 110) or, alternatively, the data packet has been generated by a malicious entity, a classification process (e.g., utilizing a machine learning framework, machine learning model(s)) is presented, wherein the classification process can recognize an active attack pattern(s) in real time, or near real time.

Figure 2:
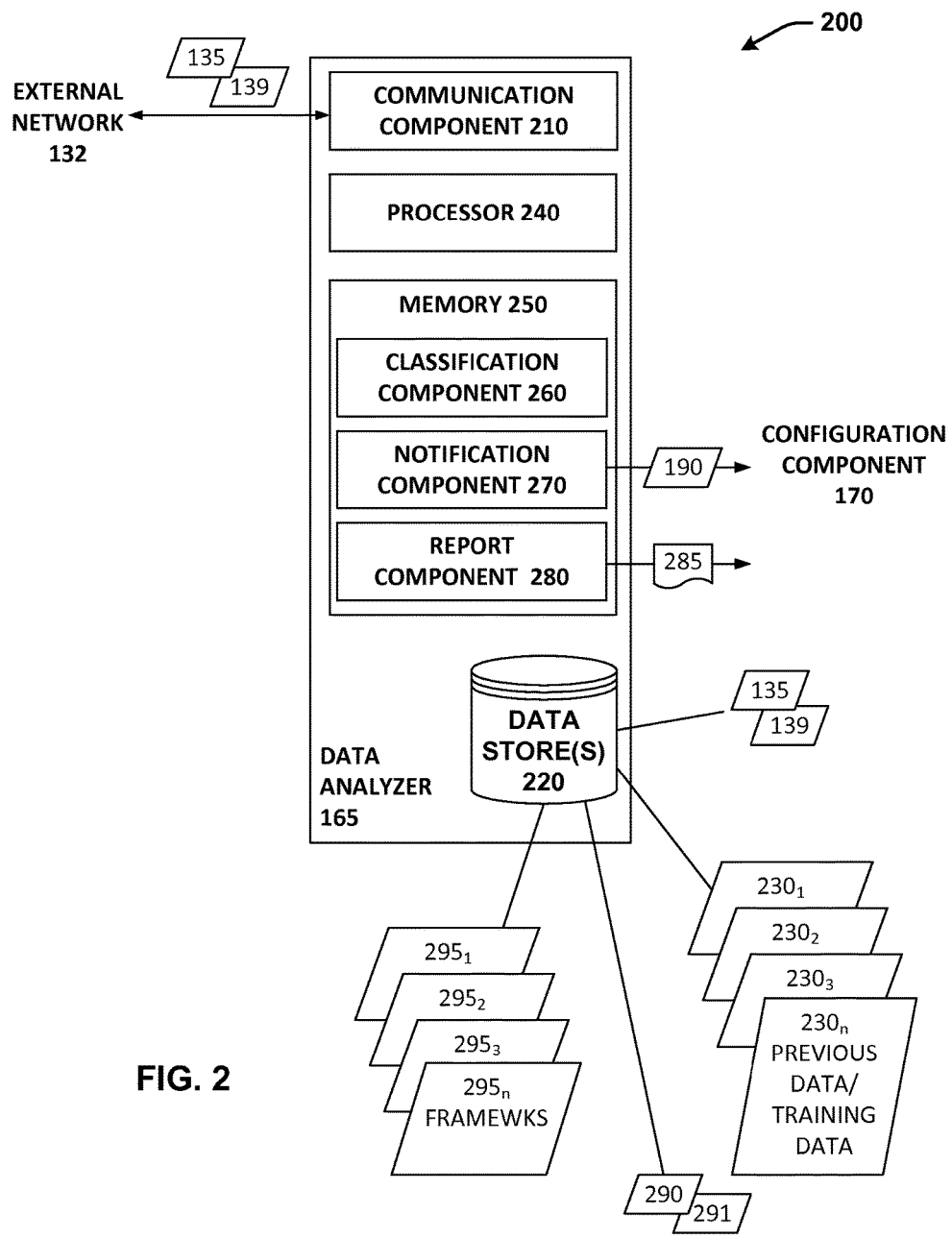
FIG. 2 is a block diagram illustrating an exemplary data analyzer for determining whether a dataset comprises malicious code.
Figure 3:
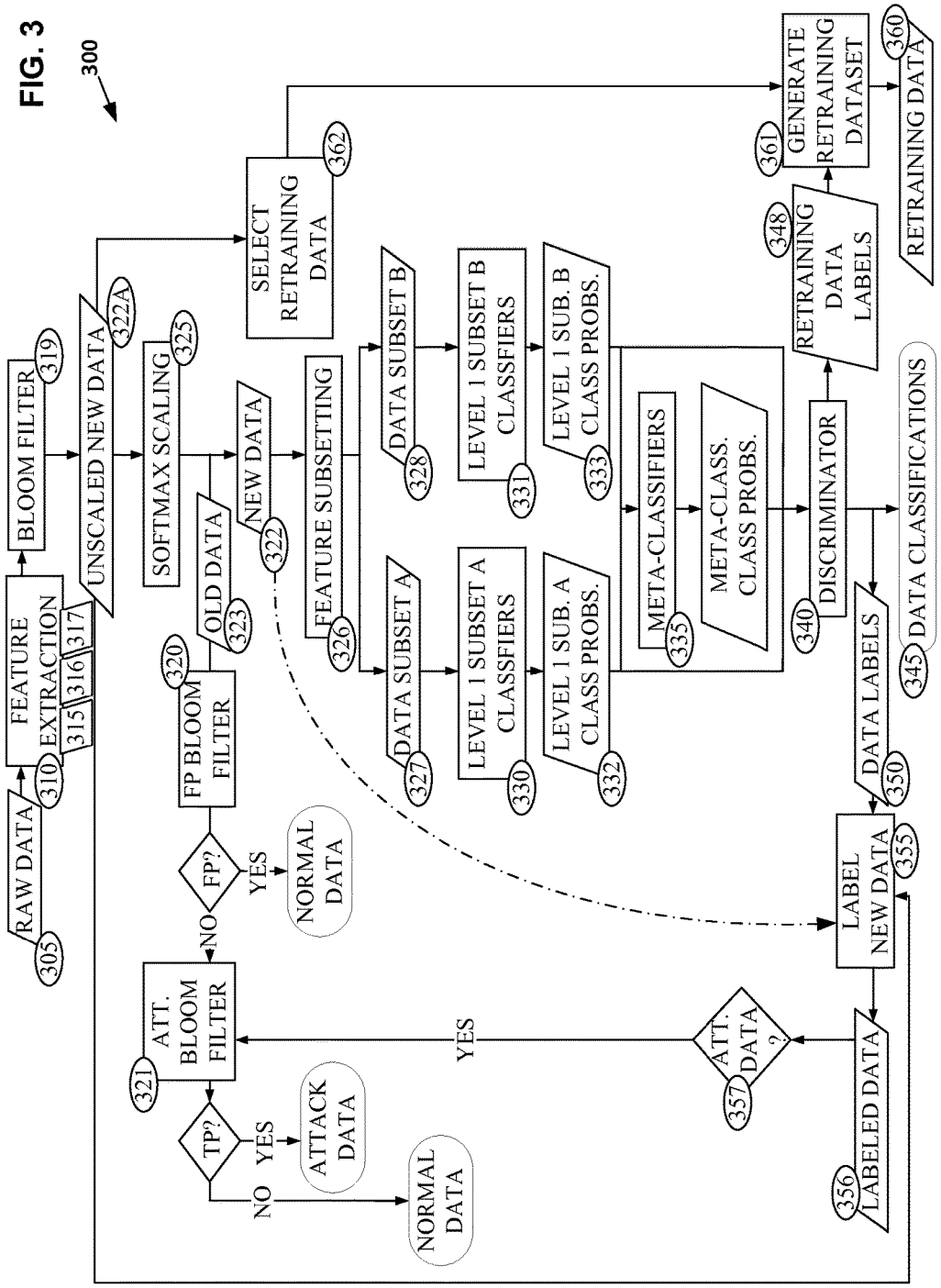
FIG. 3 is a block diagram illustrating an exemplary framework for analyzing and/or classifying a dataset.

Turning to FIGS. 2 and 3, configurations 200 and 300 illustrate various components of the data analyzer component 165 and their respective operation. Per FIG. 2, the data analyzer component 165 can include a communication component 210 which can be utilized to communicate with the edge router 134 and one or more other devices located in the LAN 130 (e.g., switches $150_1$, $150_n$, hosts, etc.), e.g., with communications being conducted with any of the previously mentioned communication protocol/format. In an embodiment, with the data analyzer component 165 located at a host (e.g., any of hosts $155_{1-n}$, $156_{1-n}$), the data analyzer component 165 can be in communication with the edge router 134, and receives data packets therefrom.

Data packets (e.g., data packets 135, 139) received at the communication component 210 can be stored, e.g., in data store(s) 220. As further described, information in a data packet can be classified as to whether the data packet is from an authorized source, or is from a malicious entity. To facilitate such classification, one or more collections of training data, datasets $230_1$-$230_n$, can also be stored in the data store 220. The datasets $230_1$-$230_n$ can be utilized to configure (train) the classification operation, wherein the datasets $230_1$-$230_n$ can be previously captured data, as well as a dataset generated by a third party.

The data analyzer component 165 comprises a processor 240 and a memory 250, wherein the memory 250 comprises data that is accessible to the processor 240 and instructions that can be executed by the processor 240. With more particularity, the memory 250 comprises a classification component 260 that is configured to perform one or more functions, as further described in FIG. 3. The classification component 260 can be configured to receive a data packet (e.g., any of data packets 135, 139), and determine whether information (e.g., an instruction, a system call, etc.) in the data packet is safe to process (e.g., allow to proceed into the LAN 130) or constitutes an attack on one or more devices included in system 100, and in particular, devices in LAN 130.

The classification component 260 is configured to utilize a framework, framework 295, as illustrated in FIG. 3. As further described, a plurality of frameworks $295_1$-$290_n$ can be generated and utilized, wherein the plurality of frameworks $295_1$-$290_n$ can be stored in the data store 220. Utilization of the framework 295 enables the classification component 260 to identify (recognize) an attack vector(s) and further, to generalize knowledge from previously identified attacks (e.g., known attacks) to recognize a new, subsequent attack(s). In an embodiment, response to an attack can include transforming a network(s) (e.g., LAN 130), and component(s) and application(s) located therein into moving targets by applying one or more network parameter randomization techniques, as further described herein.

A notification component 270 is further included in the data analyzer component 165, wherein the notification component 270 is configured to generate the notification 190, wherein the notification 190 is generated in response to the classification component 260 determining a data packet (e.g., data packet 139) or host-based behaviors constitute an attack on the LAN 130 or devices in the LAN 130. Further, the data analyzer component 165 comprises a report component 280 configured to generate a report 285, wherein the report 285 details one or more classification results generated by the classification component 260 when analyzing a data packet (e.g., data packets 135, 139). The report 285 can include information identifying whether the data packet was determined to include expected data (e.g., a benign business request from the remote system 110) or unexpected data (e.g., attack data generated by the attack computer 138).

The framework 295 is dynamic, enabling one or more specifics of the detection mechanism to change (or be adjusted) over time. The framework 295 as executed by the classification component 260, and the various processes, decisions, generated data, etc., pertaining to the framework 295, is described in the following subsections.

a) Raw Data and Feature Extraction

At 310 of FIG. 3, data 305 (e.g., any of data packets 135, 139) received at the data analyzer component 165 is processed by the classification component 260, wherein, a feature extraction operation 310 can be performed to extract one or more features 315 from raw input data included in the dataset 305. As mentioned, the dataset 305 can comprise of data in the data packets 135 and 139, while previous data (e.g., $230_1$-$230_n$) can be utilized to train the classification component 260. The previous data can be previously captured data, as well as a dataset generated by a third party. In an embodiment, during initialization of the framework 295 (e.g., during training, conceptualization), the dataset 305 can be an industry standard dataset such as a Kyoto 2006+ dataset (which comprises features extracted from network traffic collected at Kyoto University from a regular mail and DNS server and several honeypots between 2006 and 2009), a KDD-CUP-1999 dataset, etc. Other types of data can be processed with (e.g., trained with, classified with) the framework, wherein other datatypes include, host based features, system performance statistics and statistics derived from sequences of system calls, etc.

For the various feature 315 extracted from the dataset 305, one or more feature vectors 316 can be generated. In an example embodiment, 14 features 315 were extracted from a dataset 305, and include source port, destination port, IP address, start time, duration of a request session, etc. The 14 example features 315 include:

i) duration: length (number of seconds) of the connection.

ii) service: network service on the destination, e.g., http, telnet, etc.

iii) src_bytes: number of data bytes from source to destination.

iv) dst_bytes: number of data bytes from destination to source.

v) count: number of connections to the same host as the current connection in the past x seconds, wherein x is a value greater than zero. E.g., x=2.

vi) same_srv_rate: % of connections in the count feature to the same service.

vii) serror_rate: % of connections in the count feature that have "SYN" errors.

viii) srv_serror_rate: % of connections whose service type is the same to that of the current connection in the past x seconds that have "SYN" errors.

ix) dst_host_count: among the past 100 connections whose destination IP address is the same to that of the current connection, the number of connections whose source IP address is also the same to that of the current connection.

x) dst_host_srv_count: the number of connections in the dst_host_count feature whose service type is also the same to that of the current connection.

xi) dst_host_same_src_port_rate: % of connections in the dst_host_count feature whose source port is the same to that of the current connection.

xii) dst_host_serror_rate: % of connections in the dst_host_count feature that have "SYN".

xiii) dst_host_srv_serror_rate: % of connections in the dst_host_srv_count feature that "SYN" errors.

xiv) flag: normal or error status of the connection.

Additional features 317 can be derived from the extracted features 315. Inclusion of the additional features can improve the performance of the one or more machine learning algorithms included in the framework 295. For example, from the 14 example extracted features 315, additional derived features 317 include:

total_bytes: src_bytes+dst_bytes
$\log_{10}$(src_bytes)
$\log_{10}$(dst_bytes)
src_bytes/duration
dst_bytes/duration
total_bytes/duration
log_duration: $\log_{10}$(duration)
count/duration
dst_host_count/duration
dst_host_srv_count/duration
dst_bytes*dst_host_count
dst_bytes*dst_host_srv_count
same_srv_rate*srv_serror_rate
same_srv_rate*dst_host_count
same_srv_rate*dst_host_srv_count
srv_serror_rate*dst_host_srv_count
dst_host_count*dst_host_srv_count In an embodiment, the service and flag features can be represented with a one-hot binary encoding.

It is to be appreciated that the foregoing extracted features 315 and derived features 317 are examples of features (both extracted and derived) that can be utilized by one or more the algorithms (e.g., machine learning algorithms) included in the framework 300. However, the list of example features is not exhaustive, and any feature of interest during dataset characterization and training of the framework 300 can be utilized. Analysis of features 315 and feature vectors 316 can include analyzing a sequence of system calls and/or sequences of results of systems to determine number of sequences that differ from a training sequence in at least 0 positions, number of sequences that differ from a training sequence in at least 1 position, number of sequences that differ from a training sequence in at least n positions, % operations from infrequent processes, % operations from new processes, % of sequences that are new, % operations from most prevalent process, % of operations from 2 most prevalent processes, % of operations from n most prevalent processes, etc.

As previously mentioned, the previous dataset(s) $230_1$-$230_n$ can be utilized to train any machine learning algorithms included in the framework 295 for future classification of unknown traffic (e.g., any of data packets 135, 139), and hence, can be representative of what is observed in normal operation of the one or more components in system 100. Further, a current dataset undergoing classification can be subsequently utilized to train the framework 295.

b) Bloom Filters

After the various features 315 have been extracted, the data can be processed with a sequence of Bloom filters (e.g., Bloom filters 319, 320, 321). Bloom filters are a probabilistic method for determining the newness of data (e.g., newness of data 135, 139 as determined from the old datasets $230_1$-$230_n$). A Bloom filter comprises an array in which all values are initialized to zero. When data is received by the Bloom filter, the data is first hashed by one or more hash functions. The hashed values are then used as indices into the Bloom filter array. At each index pointed to by a hashed value, the value in the Bloom filter is set to 1. With 100% probability old data will have a '1' at each index, while with high probability that is adjustable by controlling the parameters of the Bloom filter, any new data is configured to have a '0' at one or more indices.

Bloom filters are utilized for data reduction and to enable control of any false positive and false negative rates. The first Bloom filter 319 separates new data 322 from old data 323 in the dataset 305 such that only new data 322 has to be analyzed with any machine learning models included in the framework 295. Old data 323 is then sent to the second Bloom filter 320 (e.g., a false positive (FP) Bloom filter 320), wherein the Bloom filter 320 contains feature vectors generated from false positive conditions. If the old data 323 being processed is found in the Bloom filter 320, then the dataset 305 can be labeled as being "normal data". Hence, in an example embodiment of processing a data packet 135, the data contained therein is determined to be present in the Bloom filter 320, then the data packet 135 is identified as being normal data (e.g., flagged as safe data), and is safe for further processing, e.g., the data packet 135 can be forwarded to the LAN 130.

If the old data 323 is not found in the FP Bloom filter 320, then the old data 323 is processed by a third Bloom filter 321, wherein the Bloom filter 321 contains feature vectors generated from previously classified attack data. If the data being processed is found in the Bloom filter 321 then the data can be labelled (flagged) as being "attack data". If the data being processed is not found in the Bloom filter 321 then the data can be labelled as being "normal data". In an embodiment, the FP Bloom filter 320 and the attack Bloom filter 321 can be initially populated with known feature vectors from a labeled training set, wherein the feature vectors can have the class label removed.

During operation, all feature vectors 316 are added to the initial Bloom filter 319, and any feature vectors classified as an attack vector are added to the attack Bloom filter 321, again with the class labels removed. In an embodiment, during operation of the classification component 260, in addition to the Bloom filtering procedures being performed automatically, an analyst can further maintain the FP Bloom filter 320 and the attack Bloom filter 321 (e.g., manually). Any feature vectors that are generated during operation of the classification component 260 can be stored, e.g., as feature vectors 290 in the data store 220. For example, any features vectors that are classified as attack data can be stored in a database in the data store 220 (e.g., as data $203_{1-n}$). Further, to facilitate further training of, and/or future classification with, the framework 295, any raw data associated with the feature vectors can also be stored in the data store 220 (e.g., as data 291).

c) Softmax Scaling

A scaling component 325 is utilized to scale data, wherein, in an embodiment, the scaling component 325 is a Softmax scale. Any new data 322 received at the classification component 260 can be scaled as a preprocessing step. Softmax scaling is a normalization approach that does minimal harm to the information content of the input dataset, Softmax scaling compresses all numerical values to the range [0,1]. The transformation is linear at the mean but has smooth nonlinearities at both extremes of the range. Such an approach enables any machine learning models in the framework 295 to process data that is outside of the ranges observed during training. The normalized data, $v_n$, is calculated as $$v_n = \frac{1}{1 + e^{-v_t}},$$

where $$v_t = \frac{v_i - \text{mean}(v_i)}{\text{std dev}(v_i)/2\pi}$$

and $v_i$ is the unscaled data 322A. There is one $v_t$ for each continuous feature, and new $v_t$ values can be calculated during a retraining cycle. The Softmax scaled data 323 is then provided as input for the Bloom filters 320 and 321, and the Softmax scaled data 322 is forwarded for feature subsetting.

d) Generating Retraining Dataset

As previously mentioned, the framework 295 can generate a retraining dataset(s) 360 for periodic retraining of the framework 295. Retraining data 360 (e.g., generated at 361) comprises a mix of old data from previous training or retraining datasets, and of newer data 362 processed since the last retraining cycle. Retraining can be conducted at any suitable time, for example, after a defined number of feature vectors 316 have been processed, after a number of data packets have been processed, after a defined period of time, etc.

In an example scenario, retraining can occur after 200,000 new feature vectors 316 have been processed. Of these new feature vectors, approximately 6% are considered for inclusion in the retraining dataset. Of these 6%, with 80% probability the feature vector 316 is added to the retraining dataset 360. For the remaining 20% of the time, a feature vector 316 is randomly chosen from the previous training or retraining dataset for inclusion. Further, the example retraining dataset(s) 360 can be developed to consist of an even balance of 5000 attack vectors and 5000 normal vectors. To achieve this balance, a check for deviations from balance is performed prior to (e.g., immediately before) retraining. If more than 60% of the retraining dataset 360 has the same class label then some of the feature vectors are removed and replaced with feature vectors from a previous training or retraining dataset to achieve a balance. Since labeled datasets are required for training, the new data is labelled with the classification provided by the framework 295, as further described (e.g., by a discriminator).

e) Feature Subsetting

Feature subsetting 326 is performed to split the feature vectors 316 in the new data 322 into a plurality of subsets. In embodiment, the feature vectors 316 are split into two subsets, data subset A 327 and data subset B 328, by uniformly at random assigning each feature to one or both data subsets 327 and/or 328. The one-hot encoded representations of the service and flag features are included in both subsets 327 and 328. A benefit to splitting the feature vectors 316 in the new data 322 into two feature sets 327 and 328 is to provide independence between the models trained on the different feature sets 327 and 328. When the models trained on the different feature sets 327 and 328 are later combined into an ensemble, if the classification errors of the subsets of models are uncorrelated, due to their independent feature sets, then the final ensemble can have a better performance than any of the individual classifiers.

f) Boosted Classifiers

An ensemble of classifiers are trained on each of the feature subsets 327 and 328. Each ensemble contains one each of the Naïve Bayes, logistic regression, support vector machine (SVM), and random forest classifiers, and are termed level 1 classifiers 330 (for application with subset A 327) and 331 (for application with subset B 328). It is to be appreciated that as well as the previously mentioned classifiers, any suitable classifier can be utilized, for example, a neural network classifier, a k-nearest neighbors classifier, etc. In an embodiment, an Orange Data Mining Toolbox can be utilized for implementations of the models. Each of these classifiers 330 and 331 has a number of configurable hyper-parameters. For instance, in Naïve Bayes the probability estimator is modified, wherein the probability estimator is utilized for estimating prior class probabilities amongst m-estimates, Laplace estimation, and relative frequency estimation, and can also choose whether to tune the classification threshold for choosing between classes. In SVM, a selection is made between different SVM types, kernel types, various parameters for the different SVM types and kernels, and termination criteria. In logistic regression the solver type and regularization parameter are modified. With the random forests, the number of trees in the forest and the number of features can be varied in consideration of determination of where to split the nodes during tree induction.

A random search is performed to optimize selection of the hyper-parameters. In each iteration of the search, values are randomly assigned to the hyper-parameters for the classifier under consideration, and then a boosted learner is created comprising a plurality of learners with these hyper-parameters, e.g., the boosted learner comprises 30 learners. The resulting boosted learner is then trained on half of the training data and tested on the other half. The division of the training data is random and differs for each of the machine learning techniques. The learners can be evaluated using Matthew's correlation coefficient (MCC). In terms of true positives (TP), true negatives (TN), false positives (FN), and false negatives (FN), the MCC is defined as $$MCC = \frac{TP \times TN - FP \times FN}{\sqrt{(TP+FP)(TP+FN)(TN+FP)(TN+FN)}}$$

and has range [−1,1] with a score of 1 indicating perfect performance, 0 indicating no better than chance, and −1 indicating complete inaccuracy in prediction. In an embodiment, the random search is terminated if an iteration's score differs from the previous maximum by less than 0.001 and the maximum score exceeds 0.7, or when a maximum of 15 iterations are reached.

In an embodiment, the performance of the ensemble is optimized, rather than that of the individual classifiers. As such, the optimization begins with an empty ensemble and searches for an optimal hyper-parameter selection for the Naïve Bayes classifier. Then, the logistic regression, SVM, and random forest classifiers are added, in turn, to the ensemble. Combining heterogeneous classifiers into an ensemble in this way has been shown to increase prediction accuracy.

g) Boosted Meta-Classifiers

The classification probabilities 332 and 333 from the level-1 classifiers 330 and 331 are input to an ensemble of meta-classifiers 335. Any number of classifiers 330 and/or 331 can be included in an ensemble of meta-classifiers 335. In an example embodiment, during training, between 8 and 15 classifiers can be randomly chosen to be included in the ensemble of meta-classifiers 335. Each of the meta-classifiers 335 is randomly chosen to be a Naïve Bayes, logistic regression, SVM, or random forest. Each of the meta-classifiers 335 takes as input the classification probabilities 332 and 333 from a random selection of two to six of the level-1 classifiers 330 and/or 331. As with the level-1 classifiers 330 and 331, a random search for hyper-parameter optimization can be performed, a boosted learner containing a plurality of learners (e.g., 30 learners) with these hyper-parameters can be formed, and utilize meta-classifier class MCC to score the models.

h) Boosted Discriminator

The classification probabilities from the two blended level-1 ensembles 332 and 333, and from each of the meta-classifiers 335 are input into a discriminator 340. In an embodiment, the discriminator 340 can be a random forest for final classification, wherein final classification generates the data classification(s) 345. A random search for hyper-parameter optimization can be performed and based thereon, a boosted collection of learners can be formed from the hyper-parameters. In an example embodiment, a boosted collection of 30 learners can be formed with the hyper-parameters. The classifications 345 can be utilized to label 355 the (unscaled) testing data 322A to generate labeled data 348 so that it can be incorporated into the retraining dataset 360, and, as necessary, added to the attacks Bloom filter 321. A data label(s) 350 output from the discriminator 340 can also be utilized as a classification for each feature vector 316 in the new data 322, wherein labeled data 356 generated therefrom can be identified as being attack data 357, and accordingly incorporated into the attack Bloom filter 321 for application with a subsequently received dataset.

i) Dynamic Aspects of a Framework(s)

The framework 295 can be dynamic in a plurality of aspects. In an example embodiment, it is possible to randomize the selection of subsets of features for the level-1 ensembles 327 and 328. The number of level-1 ensembles can also be varied, e.g., even though two level-1 ensembles are presented in FIG. 3, three or more ensembles can also be utilized. In another embodiment, a number and type of classifiers 330 and 331 in the level-1 ensembles can be adjusted, and also the number and types of meta-classifiers 335 utilized. In a further embodiment, selection of retraining data 360 is randomized, and the balance of new data 322 and older data 323 in the retraining dataset(s) 360 can be varied. It is also possible to vary the frequency of retraining. Further, it is also possible to train several distinct copies of the framework 295, e.g., any of frameworks $295_1$-$295_n$, and randomly choose which of the copies to use to classify incoming data 135, 139, 305. By utilizing a variety of randomizations, an ability for an adversary to inject malicious data to train the models in the framework(s) 295 to classify adversarial data as being normal is minimized or negated.

j) Results

The framework 300 has been tested with the Kyoto 2006+ dataset. Initial training was a balanced training set of 6132 samples (3066 attack vectors and 3066 normal vectors) selected by randomly 1000 attack samples and 1000 normal samples each from the 1 Jan. 2007 to 7 Jan. 2007 data. Next, duplicate entries from this dataset were removed, and then balanced the result so that there would be equal numbers of attack and normal vectors present. Retraining datasets were generated using the procedure described in the Generating Retraining Dataset section above, making these 6132 samples the only ground-truth labeled data utilized in the test. The 8 Jan. 2007 to 31 Aug. 2009 data was utilized as the test set. In total, the test set consisted of 89,087,080 samples. Results from the tests are presented in Table 1, below, where the test results are also compared with previous work. In Table 1, the AUC score is the area under the receiver operating characteristic curve. The AUC indicates the probability that a classifier will rank a random positive instance higher than a random negative instance, and accordingly, represents a tradeoff between precision and recall.

| Classifier | MCC | Recall | False Positive Rate | AUC Score |
| --- | --- | --- | --- | --- |
| Ensemble A | 0.9355 | 0.9889 | 0.0495 | 0.9697 |
| Ensemble B | 0.9456 | 0.9932 | 0.0347 | 0.9829 |
| Signature IDS | N/A | 0.0900 | 0.0162 | N/A |
| Anomaly Detection | N/A | 0.8093 | 0.0590 | N/A |
| Maximum Entropy | N/A | 0.7729 | 0.0206 | 0.7204 |
| Linear SVM | N/A | 0.9895 | 0.0353 | 0.9630 |

Table 1: Results from testing of the framework 300 presented herein, on data from 8 Jan. 2007 to 31 Aug. 2009 (ensemble A), from testing it on the subset of data (ensemble B), from a signature based IDS included in the dataset (Signature IDS), and from prior work (Anomaly Detection, Maximum Entropy, Linear SVM). The ensemble B results use the same test set as Kishimoto, et al., "Improving performance of anomaly-based ids by combining multiple classifiers", Applications and the Internet (SAINT), 2011 IEEE/IPSJ 11th International Symposium on. IEEE, 2011, and Symons, et al., "Nonparametric semi-supervised learning for network intrusion detection: combining performance improvements with realistic in-situ training", Proceedings of the 5th ACM workshop on Security and artificial intelligence. ACM, 2012, which are incorporated herein by reference.

2. Network Randomization

As previously mentioned, as well as utilizing the data analyzer component 165 in conjunction with the framework 300 to determine whether an attack is occurring, it is also possible to randomize one or more network parameters to prevent an adversary from determining information pertaining to a network device (e.g., an IP address), and subsequently initiating an attack on the network device.

Figure 4:
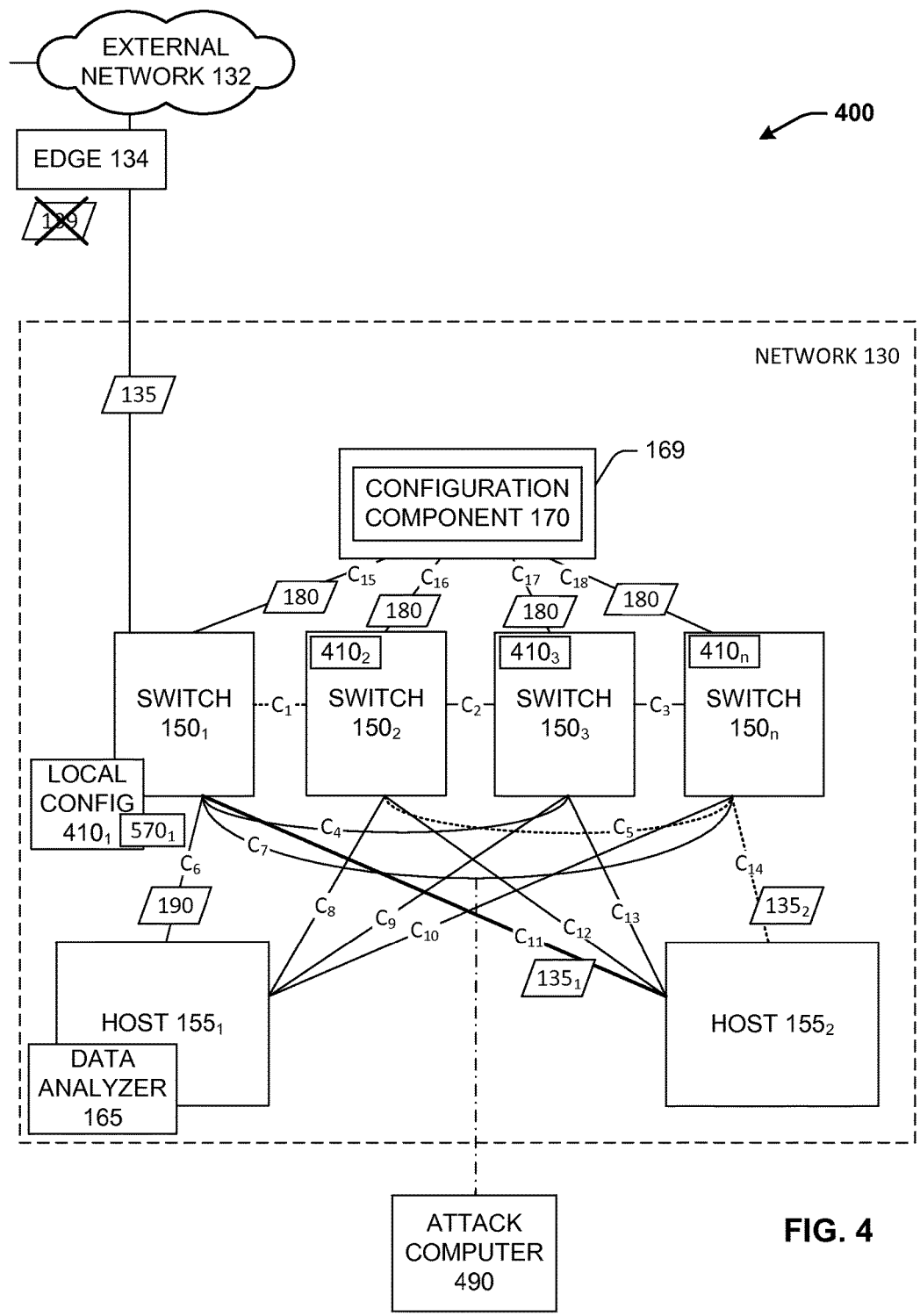
FIG. 4 is a block diagram illustrating a dynamically configured network, and components included therein.

FIG. 4, configuration 400 illustrates LAN 130 and various devices included therein. FIG. 4 extends concepts presented in FIG. 1. A plurality of devices included in LAN 130 are communicatively coupled by a plurality of connections (e.g., connections $C_1$-$C_{18}$), and the LAN 130 is communicatively coupled to the WAN 132 and components attached thereto. As previously described, a centralized computer 169 (with the configuration component 170 executing thereon) can be located at one of the devices included in the LAN 130. Further, a plurality of local configuration components $410_{1-n}$ can be respectively located at the various switches $150_{1-n}$ (and hosts $155_{1-n}$ (not shown)), wherein the local configuration components $410_{1-n}$ are configured to receive configuration information (e.g., a configuration update 180) from the centralized computer 169 and apply the configuration update information locally at the respective switch $150_{1-n}$, as further described herein. As further shown, an attack computer 490 can also be attempting to eavesdrop on a communication channel (e.g., channel $C_7$) to obtain information pertaining to one or more network parameters of the one or more devices located on the LAN 130.

A notification 190 can be generated by the data analyzer component 165 and transmitted to the configuration component 170 at the computer 169. The notification 190 can be an indication that the data analyzer component 165 has detected an attack was underway against one or more devices included in the LAN 130. In response to receiving the notification of an attack, the configuration component 170 can issue a configuration update 180 to each of the local configuration components 410$_{1-n}$ in the LAN 130 to change one or more network parameters associated with each respective device and/or component. As well as the configuration component 170, any other device located on the LAN 130 can receive the data packet 135, while the attack data packet 139 is captured by the data analyzer component 165 and is not transmitted further across the LAN 130.

Figure 5:
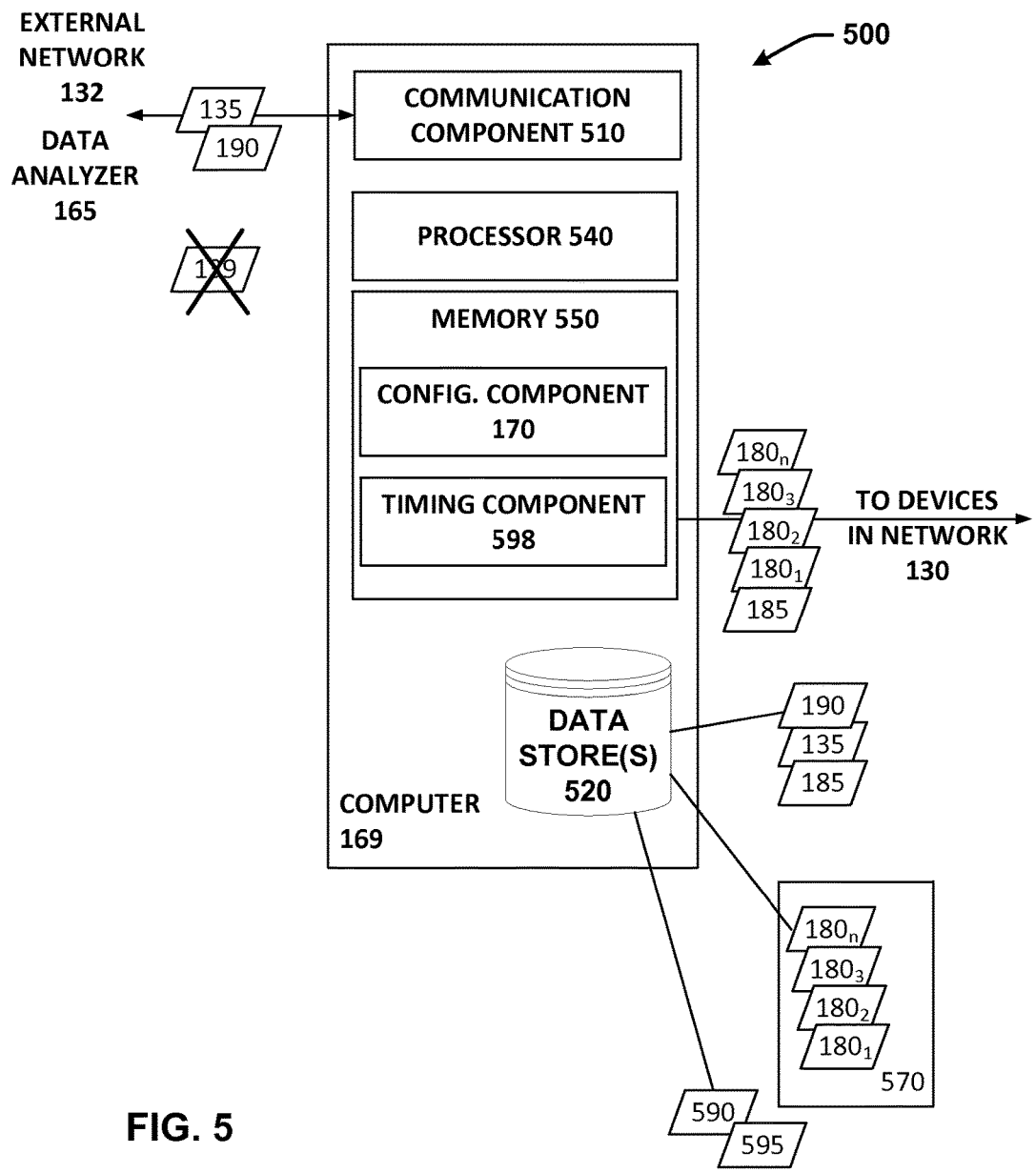
FIG. 5 is a block diagram illustrating an exemplary computing device and configuration component for dynamically configuring one or more operational parameters of one or more components in a network.

Turning to FIG. 5, configuration 500 illustrates various components included in the computer 169. The computer 169 can include a communication component 510 which can be utilized to communicate with the edge router 134 and one or more devices located in the LAN 130 (e.g., via switches 150$_1$-150$_n$), e.g., with communications being conducted with any of the previously mentioned communication protocols/formats. Any data packets 135 and notifications 190 received at the communication component 510 can be stored, e.g., in data store(s) 520.

The computer 169 further comprises a processor 540 and a memory 550, wherein the memory 550 comprises data that is accessible to the processor 540 and instructions that can be executed by the processor 540. With more particularity, the memory 550 comprises the configuration component 170, wherein the configuration component 170 is configured to generate one or more configuration updates 180$_{1-n}$.

As further described, a sequence of configuration updates 180$_{1-n}$ can be generated by the configuration component 170 in response to receiving the notification 190, wherein the configuration updates 180$_{1-n}$ can be forwarded to each of the devices in the LAN 130. The configuration updates 180$_{1-n}$ can be compiled in a configuration update table 570. A version of the configuration update table 570 can be compiled and respectively stored locally at the local configuration components 410$_{1-n}$ (e.g., a local configuration update table 570$_1$ is shown for local configuration component 410$_1$ in FIG. 4). The sequence of configuration updates 180$_{1-n}$ can also be generated by the configuration component 170 in accordance with a timed or random schedule (e.g., SCH1, SCH2). The schedules SCH1 and SCH2 can be utilized by a timing component 598 located in memory 550 and executable by the processor 540, wherein the timing component 598 is configured to control generation of the configuration updates 180$_{1-n}$ by the configuration component. In an embodiment, generation of the configuration updates 180$_{1-n}$ can be conducted in accordance with either of the schedules SCH1, SCH2, however, the scheduled approach can be superseded by an immediate generation conducted in response to receiving an attack notification 190.

Further, the configuration component 170 can generate a map 185 of all the devices on the LAN 130, wherein the map can be forwarded to other devices on the LAN 130 by the communication component 510 of the computer 169. The map 185 can be utilized by a local configuration component 410 to determine a routing of a data packet that is received by the local configuration component 410, as further described herein.

Figure 6:
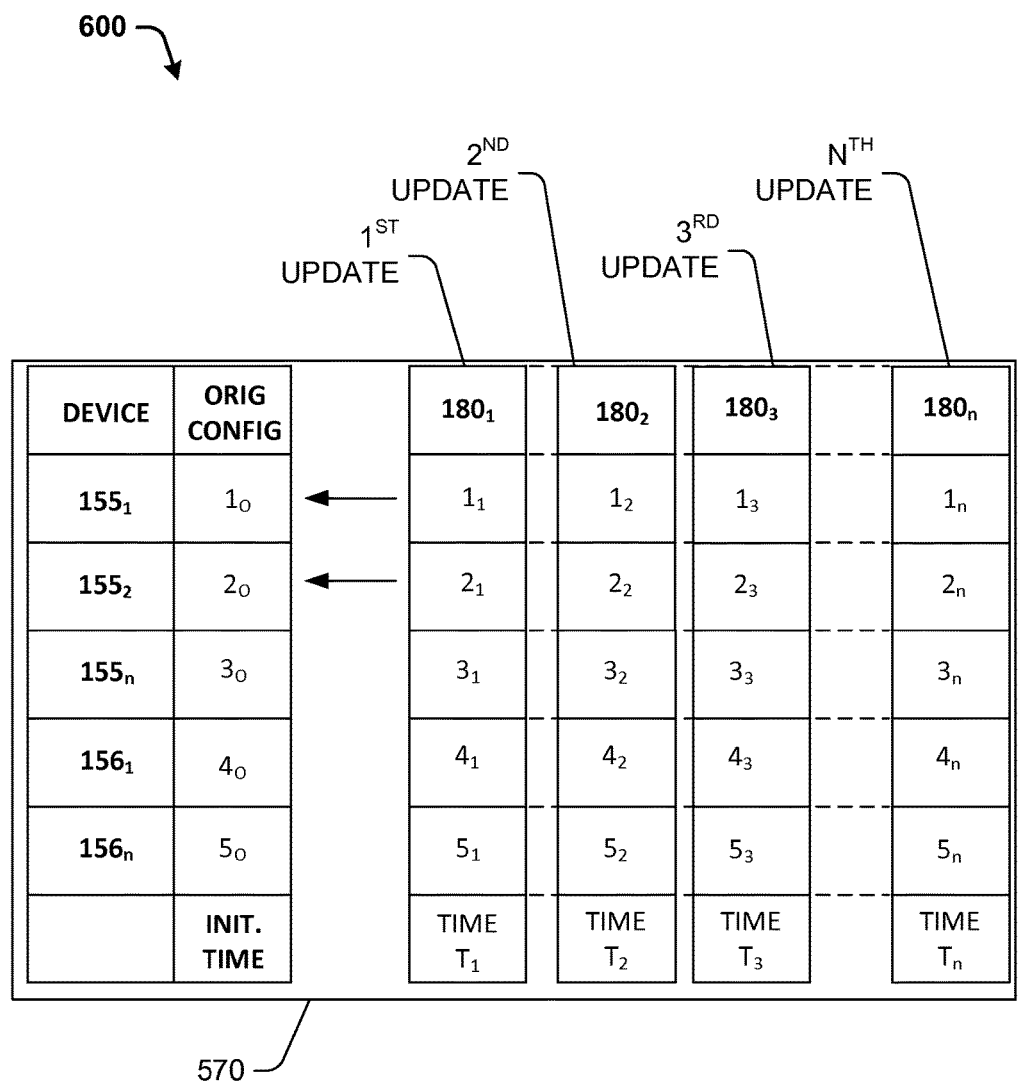
FIG. 6 is a schematic of a value of a network parameter update being paired with an original value of a network parameter according to an embodiment.

Based upon a configuration update (e.g., any of 180$_{1-n}$) received at a device, one or more configurable parameters associated with the device can be updated. FIG. 6 presents such an operation 600, wherein a plurality of configuration updates 180$_{1-n}$ are shown for the hosts 155$_{1-n}$ and 156$_{1-n}$ illustrated in FIG. 4, and the configuration updates 180$_{1-n}$ are compiled in a configuration table 570. It is to be appreciated that while FIG. 6 presents a configuration table 570, the embodiments are also applicable to the local configuration tables 570$_{1-n}$.

In an example, host 155$_1$ has an originally assigned IP address $1_o$ and host 155$_2$ has an originally assigned IP address $2_o$. The original IP address for each device (e.g., IP address $1_o$ for the host 155$_1$) functions as the base value against which any updates are updated in accordance with. At a first instance of time, time $T_1$, a first configuration update 180$_1$ is generated by the configuration component 170 and transmitted to each of the devices in the LAN 130, wherein the configuration update 180$_1$ comprises IP address updates for each of the devices in the LAN 130. For example, the IP address of the host 155$_1$ is updated from the IP address $1_o$ to IP address $1_1$, the IP address of the host 155$_2$ is updated from the IP address $2_o$ to IP address $2_1$, etc. At a subsequent time, time $T_2$, a second configuration update 180$_2$ is generated by the configuration component 170 and transmitted to each of the devices in the LAN 130, wherein the configuration update 180$_2$ comprises IP address updates for each of the devices in the LAN 130. For example, the IP address of the host 155$_1$ is updated from the IP address $1_o$ to IP address $1_2$, the IP address of the host 155$_2$ is updated from the IP address $2_o$ to IP address $2_2$, etc. As shown, a plurality of updates can be sequentially configured and transmitted to the devices in the LAN 130, such that at a later time, $T_n$, an $n^{th}$ configuration update 180$1$ is generated and transmitted to each of the devices in the LAN 130, wherein the IP address of the host 155$_1$ is updated from the IP address $1_o$ to IP address in, the IP address of the host 155$_2$ is updated from the IP address $2_o$ to IP address $2_n$, etc.

As shown in FIG. 4, each of the switches 150$_1$-150$_n$ can include a local configuration component 410$_{1-n}$. The local configuration components 410$_{1-n}$ can be configured to receive the configuration update 180 from the configuration component 170. As previously mentioned, each instance of the configuration update 180 can include a parameter update, and based thereon, each local configuration component has knowledge of the initial setting (e.g., initial IP address) for each respective device in the LAN 130, and further, knows the current setting for each respective device in the LAN 130, and furthermore, knows the next setting to be applied to each respective device in the LAN 130. With such knowledge, each local configuration component in the plurality of local configuration components 410$_{1-n}$ can receive and process a data packet (e.g., data packet 135) to ensure that the data packet is routed to the correct device, even where the parameter is now configured with a setting that is different to the originally configured value (e.g., any of $1_o$-$5_o$).

Figure 7:
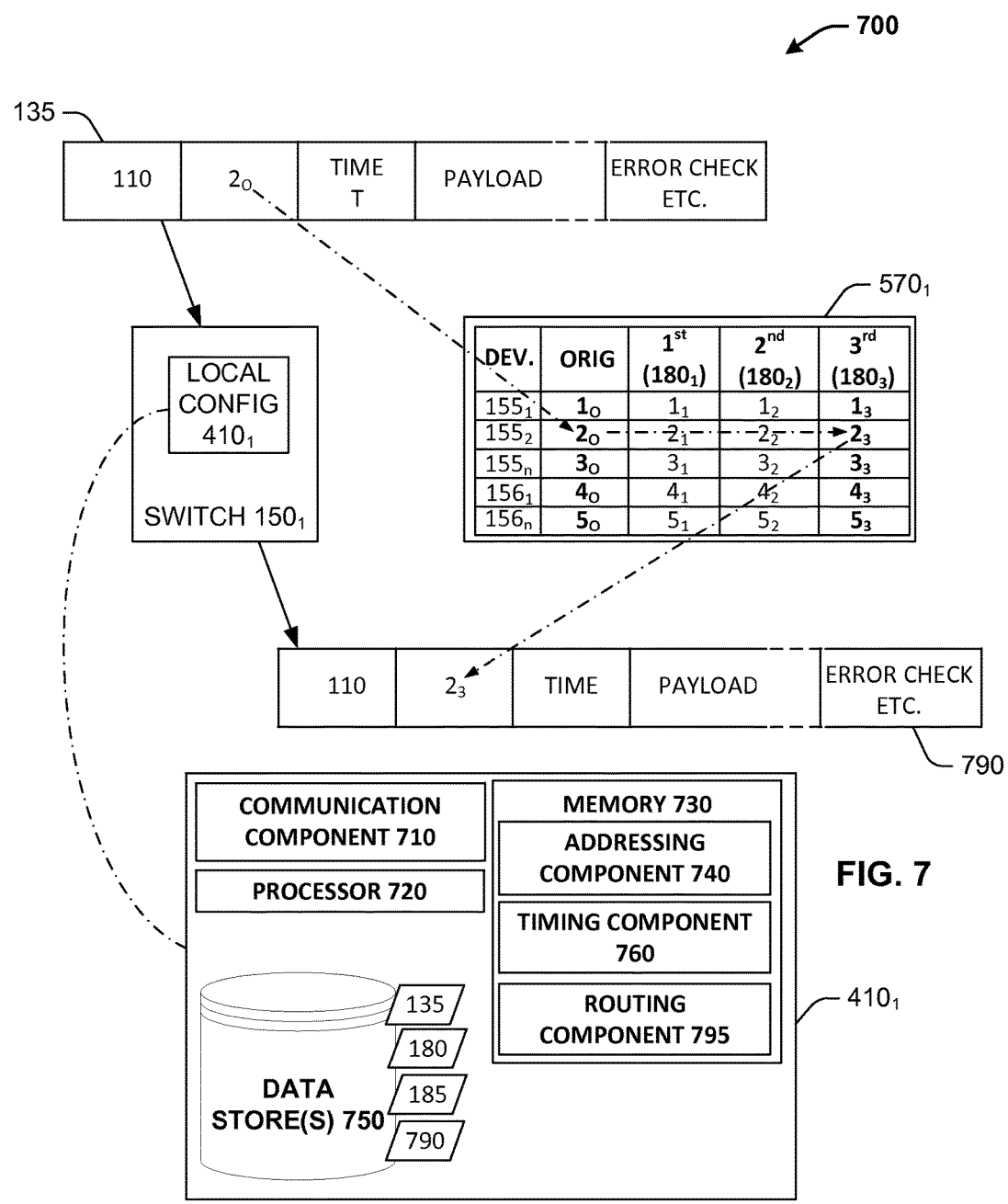
FIG. 7 is a block diagram illustrating a data packet being reconfigured in accordance with an updated parameter setting, in accordance with an embodiment.

Turning to FIG. 7, a procedure 700 for updating an IP address in a data packet being forwarded on the LAN 130 is illustrated in conjunction with the various components comprising a local configuration component. As shown, the local configuration component 410$_1$ located at the switch 150$_1$ includes a local communication component 710 which can be utilized to communicate with the edge router 134, and one or more devices located in the LAN 130, e.g., communication component 170, other switches 150$_2$-150$_n$, hosts 155$_1$-155$_n$, etc., e.g., with communications being conducted with any of the previously mentioned communication protocols/formats.

The local configuration component $410_1$ comprises a processor 720 and a memory 730, wherein the memory 730 comprises data that is accessible to the processor 720 and instructions that can be executed by the processor 720. With more particularity, the memory 730 comprises a local addressing component 740 that is configured to receive a plurality of data, information, instructions, etc., wherein the plurality of data, etc., can be a data packet (e.g., data packet 135 having an original parameter configuration, a data packet having updated configurations), a configuration update (e.g., update 180), etc., and based thereon, the local configuration component $410_1$ can determine whether to process (e.g., forward, execute code contained therein, etc.) a data packet. The data packet(s) 135 and configuration update 180 can be stored in a datastore 750. The local configuration component $410_1$ can further include a timing component 760 which can be utilized to perform latency checking on a data packet as further described herein.

In an embodiment, the local configuration component $410_1$, and similarly the configuration component 170, and the data analyzer component 165, can be standalone devices (e.g., an FPGA, ASIC, SOC, etc.), and accordingly, operate in conjunction with a local processor, memory, etc. In a further embodiment, any of the local configuration component $410_1$, the configuration component 170, and the data analyzer component 165, can be integrated into a respective switch, host, etc., wherein a processor/memory controlling operation of the switch, host, etc., also executes any of the local configuration component $410_1$, the configuration component 170, the data analyzer component 165, respective communication components 210, 510, 710, classification component 260, notification component 270, report component 280, timing component 598, addressing component 740, timing component 760, routing component 795, etc.

The data packet 135 is received at switch $150_1$, wherein the switch $150_1$ has the local configuration component $410_1$ included therein, and a local configuration update table $570_1$. The local configuration component $410_1$ analyzes the data packet 135 and determines that the data packet 135 was sourced from the remote computer 110, and from the destination IP address, the destination device is the host $155_2$. Since initiation of the LAN 130, and the various devices included therein, there have been three configuration updates (e.g., updates $180_{1-3}$) generated by the configuration component 170 and received at the local configuration component $410_1$, with the configuration update $180_3$ being the latest update. Accordingly, the local configuration component $410_1$ determines that the host $155_2$ has a current parameter configuration of $2_3$, wherein the local configuration component replaces the destination IP address $2_o$ in the data packet 135 with the current IP address of $2_3$. Upon updating the IP address to $2_3$, the data packet 135, now as reconfigured data packet 790, can be transmitted across the LAN 130 to the host $155_2$.

Hence, with reference to FIG. 4, even in a situation that an attack computer 490 is listening in (eavesdropping) on data communications on a connection in the LAN 130, e.g., is listening in to communications on connection $C_7$, and the attacker 490 has a previously obtained list of original IP addresses for the respective devices (e.g., has IP addresses $1_o$-$5_o$) the attacker 490 is unable to determine which device in the LAN 130 the reconfigured data packet 790 is directed to, as the IP address $2_3$ does not match any of the original IP addresses $1_o$-$5_o$. Further, in the event of the attacker 490 intercepting a subsequently transmitted reconfigured data packet (e.g., a data packet $790_{32}$ comprising any of IP addresses $1_{32}$-$5_{32}$ generated by a $32^{nd}$ iteration of the configuration update 180 (e.g., configuration update $180_{32}$)), the attacker 490 is still unable to determine which device in the LAN 130 the subsequent data packet is directed to, as the IP address $2_{32}$ does not match any of the original IP addresses $1_o$-$5_o$. For tracking/investigative purposes a copy of the reconfigured data packet 790 can be saved in the datastore 750 at the local configuration component $410_1$.

As well as the IP addresses of the various devices in the LAN 130 being dynamically reconfigured, a transmission path for a data packet (e.g., data packet 135) through the LAN 130 can also be dynamically configured by either the configuration component 170 or the local configuration component $410_1$. Routing of a data packet by the local configuration component $410_1$ can be performed in conjunction with the network map 185 generated by the configuration component 170 and stored in the data store 750. For example, in a first instance of a data packet, e.g., data packet $135_1$ being received at the switch $150_1$, the data packet $135_1$ is analyzed by the local configuration component $410_1$ and it is determined that the data packet $135_1$ is for the host $155_n$. Based upon the network map 185, the local configuration component $410_1$ configures the data packet $135_1$ to be transmitted to the host $155_2$ via the connection $C_{11}$ (as shown by the weighted line). However, in a second instance of a data packet, e.g., data packet $135_2$ being received at the switch $150_1$, the data packet $135_2$ is analyzed by the local configuration component $410_1$ and again it is determined that the data packet $135_2$ is for the host $155_2$. However, during this instance, the local configuration component $410_1$ configures the data packet $135_1$ to be transmitted along a different network path to the data packet $135_1$, where, as shown, the data packet $135_2$ is transmitted to the host $155_2$ via the connections $C_1 \rightarrow C_5 \rightarrow C_{14}$ (as shown by the dashed line).

Returning to FIG. 5, a latency setting 595 can be generated by a timing component 598, wherein the latency setting 595 can be utilized by the configuration component 170, wherein the latency setting 595 can be stored in the data store 520. The latency setting 595 is a value (e.g., a time window, a duration) which can be utilized to address latency across the LAN 130. The latency setting 595 can be transmitted from the configuration component 170 to the local configuration components $410_{1-n}$ to enable the local configuration components $410_{1-n}$ to determine whether a data packet received at a local configuration component is valid or has expired.

For example, with reference to FIG. 4, a data packet $135_2$ is routed from the switch $150_1$ to the host $155_2$ via the path connections $C_1 \rightarrow C_5 \rightarrow C_{14}$ (as shown by the dashed line). At a particular moment, the data packet $135_2$ has reached the switch $150_2$, however, just prior to arrival of the data packet at the switch $150_2$, a new configuration update has been received at the local configuration component $410_2$ located at the switch $150_n$. Hence, the destination address for the host $155_2$ in the data packet $135_2$ is now different to the newly received IP address update for the host $155_2$ that has been applied at the switch $150_n$. In such a scenario, the data packet $135_2$ would reach the switch $150_n$ and have a destination address that is no longer current, and the switch $150_n$ would be unable to forward the data packet across the network and effectively any data in the data packet would be lost.

Figure 8:
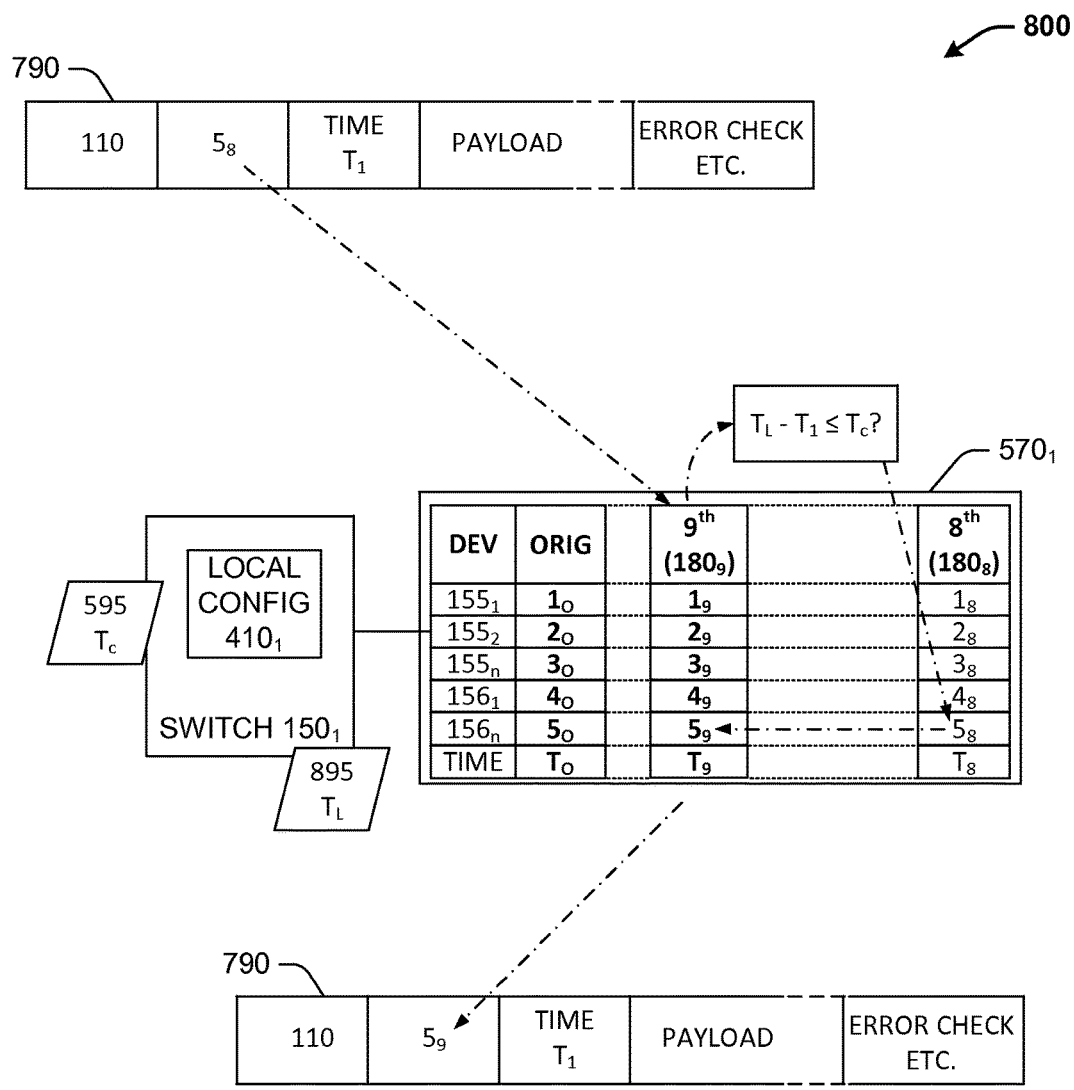
FIG. 8 is a schematic of a latency setting being utilized to identify an updated network parameter received in a prior configuration update.

FIG. 8, configuration 800 illustrates a latency setting being utilized at a switch. By utilizing the latency setting 595, a timer component can be applied such that if a data packet 135 is received at a switch (e.g., switch $150_1$) and the data packet does not include an IP address contained in the last received configuration update, the current time at the switch can be compared with the time in the data packet. If the difference between the current time at the switch and the time in the data packet (e.g., an initial time of transmission of the data packet from the edge router 134 or a switch 150$_{1-n}$) is less than a value of the latency setting 595, the local configuration component 410$_1$ at the switch 150$_1$ can compare the destination IP address with the IP addresses included in the prior received configuration update. In the event of the destination IP address being found in the prior received configurations, the data packet can be forwarded to the switch 150$_n$ and, finally, the host 155$_2$. Alternatively, in the event of the destination IP address not being found in the prior received configurations, transmission of the data packet across the LAN 130 can be terminated. The latency value 595 can be configured in accordance with a frequency at which the configuration component 170 generates and transmits configuration updates 180$_{1-n}$. In an exemplary embodiment, the latency value can be ±5 seconds. In a further embodiment, the local configuration component 410$_n$ can replace the current IP address in the data packet with the most recently received IP address, thereby preventing a latency operation having to be performed at a switch that subsequently receives the data packet on the LAN 130.

In the example presented in FIG. 8, the data packet 790 includes a destination IP address 5$_8$, e.g., wherein the data packet 790 is generated by updating one or more parameters of a data packet 135, as previously described. However, between transmission of the data packet 790 and its arrival at the switch 150$_1$, a new configuration update has been received at the local configuration component 410$_1$, with the update table 570$_1$ being updated such that the IP address of the host 156$_n$ is now set to IP address 5$_9$. Hence, upon review of the IP address 5$_8$ by the local configuration component 410$_1$, the local configuration component 410$_1$ determines that the IP address 5$_8$ is not valid as it cannot be found in the latest received configuration update. Based upon the IP address 5$_8$ not being found, the local configuration component 410$_1$ reviews the setting T$_c$ of the latency value 595 received from the configuration component 170. The local configuration component 410$_1$ determines the difference between a transmission time T$_1$ of the data packet 790, and a current time T$_L$ at the switch 150$_1$, is less than T$_c$. In response to the determination that the timing of the data packet 790 is still valid, the local configuration component 410$_1$ is configured to review one or more previously received configuration updates to determine whether the IP address 5$_8$ is present in any of the previously received configuration updates. In the example presented in FIG. 8, the IP address 5$_8$ is found to be present in the previous configuration update 180$_8$, and the data packet 790 is forwarded on to the host 156$_n$. In an embodiment, the local configuration component 410$_1$ can replace the IP address 5$_8$ in the data packet 790 with the latest IP address 5$_9$.

FIGS. 9-12 illustrate exemplary methodologies relating to determination of unexpected and/or malicious activity being directed towards a network, and further randomizing one or more parameters at the network, wherein the one or more parameters pertain to data packet routing across the network. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement the methodologies described herein.

Figure 9:
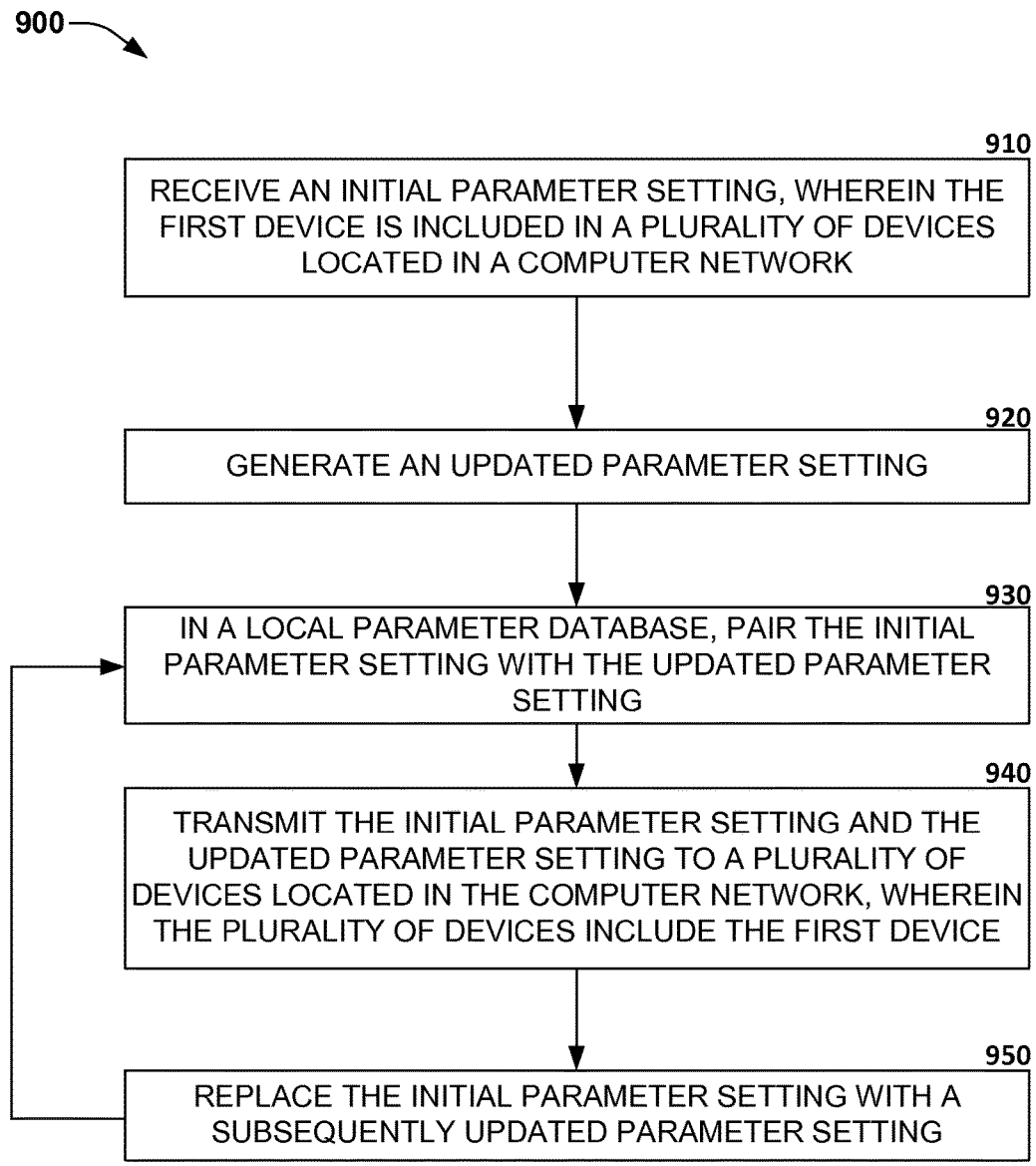
FIG. 9 is a flow diagram illustrating an exemplary methodology for randomizing a network parameter of a networked device.

FIG. 9 illustrates an exemplary methodology 900 for updating a parameter setting with a new setting, wherein the parameter pertains to routing of a data packet across a network. At 910, an initial parameter setting (e.g., an original parameter setting) for a first device (e.g., a host) located in a network is received, wherein the initial parameter setting can be received at a configuration component. The parameter can be an address, an IP address, etc., as previously described.

At 920, an updated parameter setting can be generated at the configuration component, wherein the initial parameter setting and the updated parameter setting are different.

At 930, the initial parameter setting and the updated parameter setting are stored in a database, wherein the database can be local to the configuration component.

At 940, the initial parameter setting and the updated parameter setting are transmitted from the configuration component to one or more devices located on the network, wherein the one or more devices are communicatively coupled (e.g., by one or more network connections on the local network) to the first device. The initial parameter setting and the updated parameter setting can be stored locally at the one or more devices thereby enabling a second device (e.g., a switch) having the initial parameter setting and the updated parameter setting to determine that a data packet which includes the updated parameter setting, to forward the data packet to the first device having the initial parameter setting.

At 950, at a subsequent time, another updated parameter setting can be generated, wherein the subsequent updated parameter can be combined with the initial parameter setting to form a pair of settings that can be redistributed to the one or more devices to enable a data packet having the subsequent updated parameter to be routed to the first device.

Figure 10:
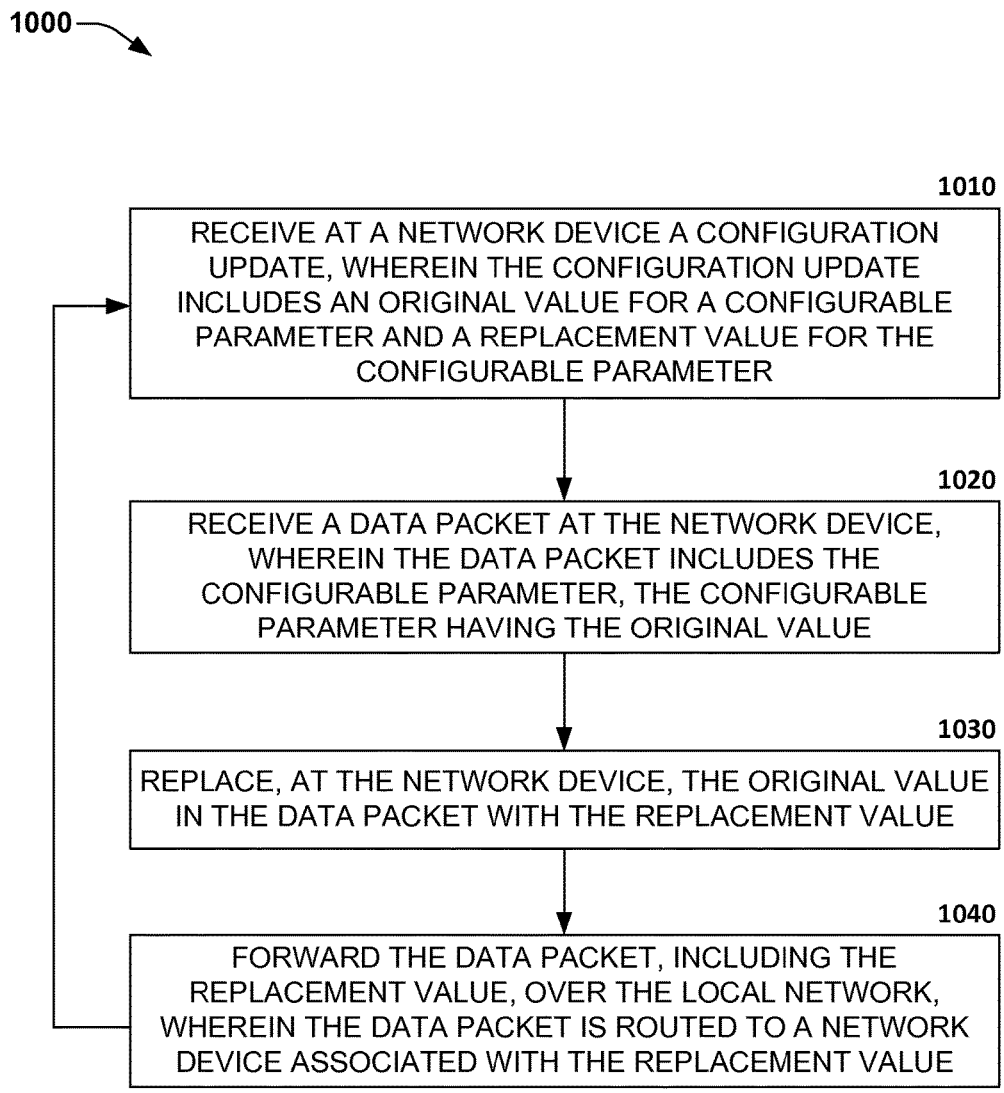
FIG. 10 is a flow diagram illustrating an exemplary methodology for replacing a network parameter in a data packet to facilitate randomizing data packets on a network.

FIG. 10 illustrates a methodology 1000 for replacing a value of a parameter in a data packet to facilitate obscuration of data routing across a network. At 1010, a configuration update is received at a device located at the network. The device can be a host located on LAN. The configuration update includes an original value for a configurable parameter, and a replacement value for the configurable parameter, as previously described. The configurable parameter pertains to routing of a data packet across the LAN to a destination device located on the LAN, wherein the data packet is generated by the host for execution at the destination device (e.g., a second host).

At 1020, a data packet is generated at the host, wherein the data packet includes the original value for the configurable parameter.

At 1030, during generation of the data packet, the host refers to the latest configuration update and the original value for the configurable parameter is replaced with the replacement value.

At 1040, the data packet can be forwarded into the LAN, wherein the data packet includes the replacement value for the configurable parameter. As previously described, owing to the original value and the replacement value both being directed to the same destination device, any device in the LAN (e.g., a switch) that receives the data packet and has knowledge of the original value and the replacement value pairing can forward the data packet to the destination device.

Figure 11:
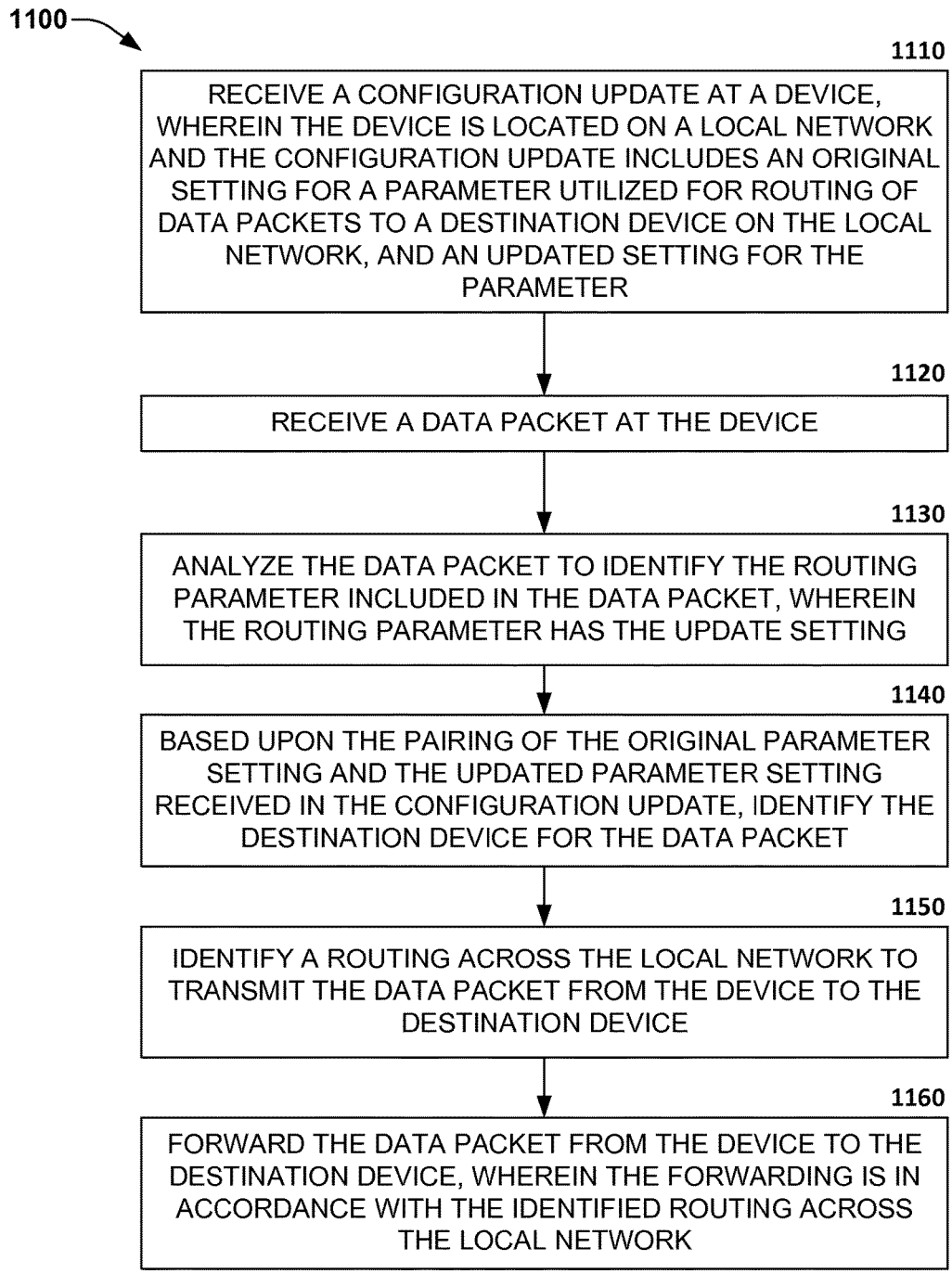
FIG. 11 is a flow diagram illustrating an exemplary methodology for determining a destination device for a data packet based upon a randomized network parameter included in the data packet.

FIG. 11 illustrates a methodology 1100 for routing a reconfigured data packet across a network. At 1110, a configuration update is received at a first routing device, wherein the first routing device (e.g., a switch, a host, etc.) is located on a local network. The configuration update is received from a configuration component that is communicatively coupled to the device. The configuration update includes a pair of values, an original parameter value (e.g., an original setting of an IP address) for a destination device (e.g., a host) and also a replacement parameter value (e.g., an updated setting for the IP address). The original parameter value and the replacement parameter value can be stored at the first routing device.

At 1120, a data packet can be received at the first routing device. The data packet can be received from a second routing device (e.g., an edge router). In an embodiment, the second routing device can be located at the junction between a wide area network and a local area network, wherein the second routing device is configured to process and/or transmit (e.g., route) data packets between devices on the wide area network and devices on the local area network. In another embodiment, the second routing device can be located within the local area network and is configured to route data packets between devices located on the local area network.

At 1130, the first routing device can analyze the data packet to determine what routing parameters are included therein, wherein the first routing device identifies the replacement parameter value.

At 1140, the first routing component can determine that based upon the identify the replacement parameter value and original parameter value pairing, the data packet is to be routed to a destination device.

At 1150, based upon the first routing device determining the destination device, and devices (if any) on the local network between the first routing device, the first routing device can generate a route for the data packet to be transmitted from the first routing device to the destination device based upon a map of the local network stored at the first routing device.

At 1160, the first routing device can forward the data packet to the destination device, wherein the data packet is forwarded via the route defined by the first routing device.

Figure 12:
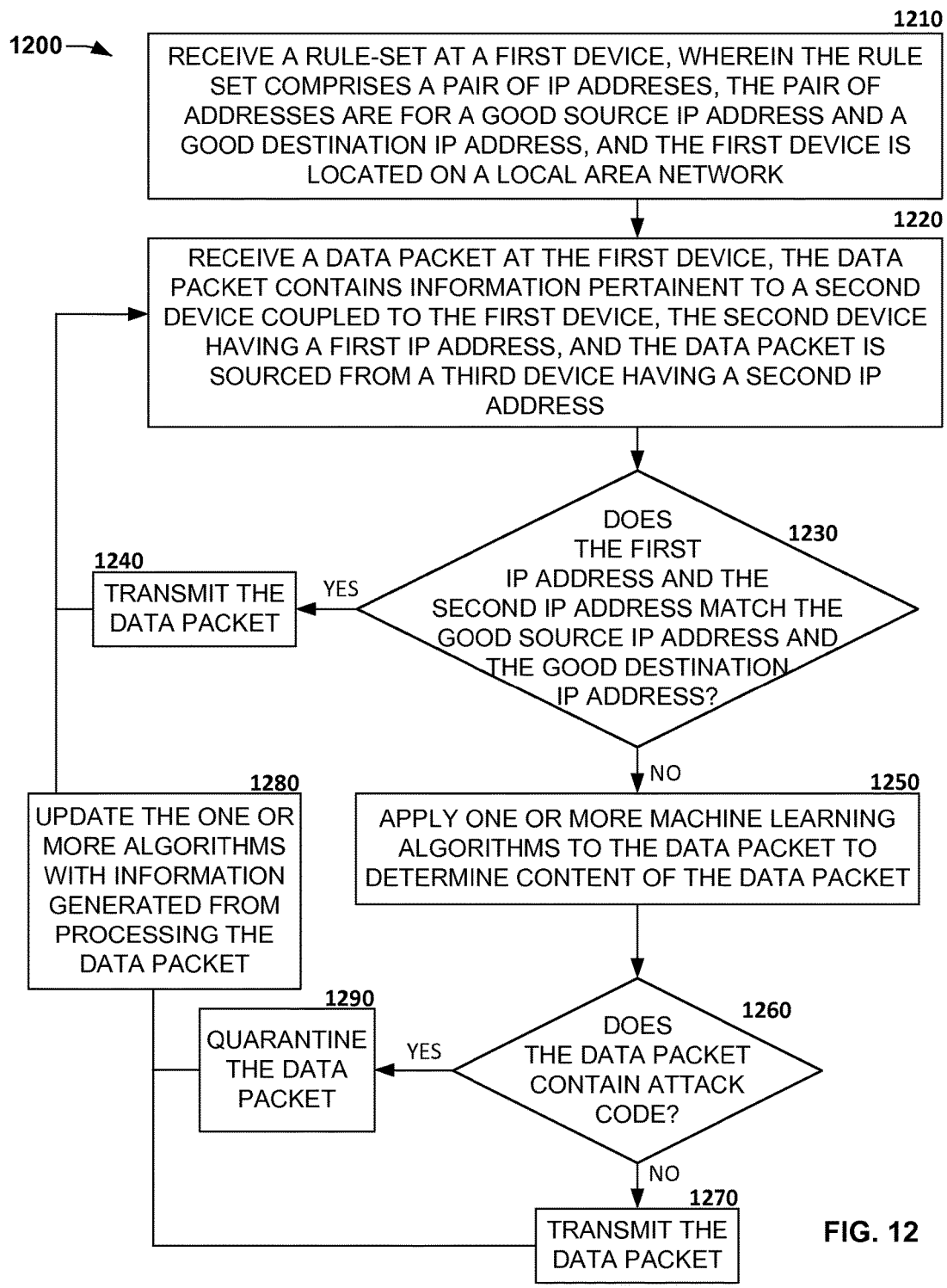
FIG. 12 is a flow diagram illustrating an exemplary methodology for detecting attack data packets.

FIG. 12 illustrates a methodology 1200 for detecting a network attack. At 1210, a rule-set can be received at a first device, wherein the first device is located on a LAN. Further, the first device can be a data packet-routing device such as a switch, wherein the switch further comprises a data analyzer component. The rule-set can be received from a configuration component and comprises a pair(s) of IP addresses, the pair of IP addresses comprise a first IP address for a device known to be a good data source and a second IP address for a device known to be a good destination device. Further, in an alternative embodiment, the first device can be any of an edge router, a host, a controller, a machine, or positioned at a location between any two devices on the LAN, e.g., between a host and a PLC, etc.

At 1220, a data packet can be received at the first device, the data packet contains data, information, etc., pertaining to a destination device (a second device) communicatively coupled to the first device. In an embodiment, the data packet is generated by a source device (a third device) located on a WAN, the WAN and the LAN are communicatively coupled. The data packet includes an IP address for the second device and an IP address for the third device.

At 1230, the switch can compare the first IP address with the second device IP address and further compare the second IP address with the third IP address to determine whether the second device IP address matches the good source IP address and the third device IP address matches the good destination IP address.

At 1240, in response to determining that YES the second device IP address matches the good source IP address and the third device IP address matches the good destination IP address, the data packet can be transmitted. The method flow can return to 1220 for receipt of the next data packet.

Returning to 1230, in response to determining that NO, at least one of the second device IP address does not match the good source IP address or the third device IP address does not match the good destination IP address, the data packet can be forwarded to the data analyzer. At 1250, the data analyzer can apply one or more machine learning algorithms to any data included in the data packet. As previously described, the one or more machine learning algorithms can be included in a framework, and are utilized to determine if the data is expected data or unexpected data (e.g., attack data).

At 1260, a determination can be made whether the data packet contains attack code.

At 1270, in response to NO the data packet does not contain attack code, the data packet can be flagged to be safe and the data packet can be forwarded to destination device on the LAN for processing (code execution) at the destination device. At 1280, any information generated during processing of the data packet can be reapplied to the one or more machine learning algorithms included in the framework to facilitate updating the one or more machine learning algorithms for processing of a subsequently received data packet(s).

Returning to 1260, in response to a determination that YES the data packet contains attack code, at 1290 the data packet can be flagged as attack data and quarantined, and further prevented from being transmitted, e.g., the data packet is not forwarded to the destination device. Again at 1280, any information generated during processing of the data packet and the attack code contained therein can be reapplied to the one or more machine learning algorithms included in the framework for processing of a subsequently received data packet(s). Flow can return to 1220 for the next received data packet.

Figure 13:
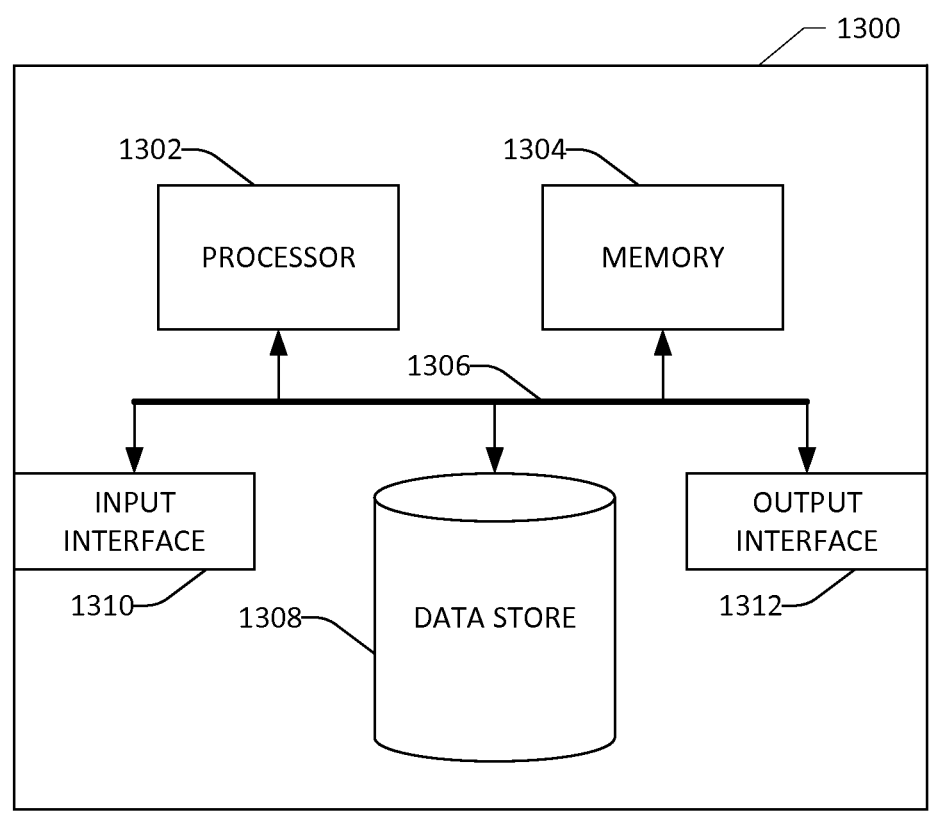
FIG. 13 illustrates an exemplary computing device.

Referring now to FIG. 13, a high-level illustration of an exemplary computing device 1300 that can be used in accordance with the systems and methodologies disclosed herein is illustrated. For instance, in an embodiment, the computing device 1300 may be used in a system to determine whether a data packet includes attack data. In another embodiment, the computing device 1300 may be used in a system to randomize one or more network parameters. For example, the computing device 1300 functions as any of the edge router 134, the data analyzer component 165, the host 155, the configuration component 170, the switch 150, the local configuration component 410, etc. The computing device 1300 includes at least one processor 1302 that executes instructions that are stored in a memory 1304. The instructions may be, for instance, instructions for implementing functionality described as being carried out by one or more components discussed above or instructions for implementing one or more of the methods described above. The processor 1302 may access the memory 1304 by way of a system bus 1306. In addition to storing executable instructions, the memory 1304 may also store operating parameters, required operating parameters, and so forth.

The computing device 1300 additionally includes a data store 1308 that is accessible by the processor 1302 by way of the system bus 1306. The data store 1308 may include executable instructions, operating parameters, required operating parameters, etc. The computing device 1300 also includes an input interface 1310 that allows external devices to communicate with the computing device 1300. For instance, the input interface 1310 may be used to receive instructions from an external computer device, from a user, etc. The computing device 1300 also includes an output interface 1312 that interfaces the computing device 1300 with one or more external devices. For example, the computing device 1300 may display text, images, etc., by way of the output interface 1312.

Additionally, while illustrated as a single system, it is to be understood that the computing device 1300 may be a distributed system. Thus, for instance, several devices may be in communication by way of a network connection and may collectively perform tasks described as being performed by the computing device 1300.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

What has been described above includes examples of one or more embodiments. It is, of course, not possible to describe every conceivable modification and alteration of the above structures or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A method for improving security of a network to attacks, the method comprising:
   repeatedly modifying addresses of a plurality of devices on a local network, wherein repeatedly modifying an address of a device in the plurality of devices comprises:
   generating a first pair of addresses for the device on the local network, wherein the first pair of addresses comprises an original address of the device and a first reconfigured address, wherein the first reconfigured address is randomly generated;
   distributing the first pair of addresses to a first switch on the local network to facilitate routing of a first data packet to the device, wherein the original device address in the first data packet has been replaced with the first reconfigured address, wherein the first reconfigured address is generated and distributed to the first switch to dynamically alter the address of the device on the local network, and further wherein the first reconfigured address is generated and distributed in accordance with one of a schedule having a defined configuration timing or a schedule having a random configuration timing;
   receiving, at the first switch, the first data packet having the first reconfigurable address;
   identifying, at the first switch, the original device address of the device based upon the first reconfigurable address in the first data packet;
   at the first switch, responsive to identifying the original device address of the device, routing the first data packet to the device based upon the original device address of the device;
   generating a second pair of addresses for the device on the local network, wherein the second pair of addresses comprises the original address of the device and a second reconfigured address, wherein the second reconfigured address is randomly generated; and
   distributing the second pair of addresses to a second switch on the local network to facilitate routing of a second data packet to the device, wherein the original device address in the second data packet has been replaced with the second reconfigured address, the second reconfigured address being different from the first reconfigured address;
   receiving, at the second switch, the second data packet having the second reconfigurable address;
   identifying, at the second switch, the original device address of the device based upon the second reconfigurable address in the second data packet; and
   at the second switch, responsive to identifying the original device address of the device, routing the second data packet to the device based upon the original device address of the device.

2. The method of claim 1, wherein the local network is an industrial control network.

3. The method of claim 1, further comprising:
   storing the first pair of addresses in a local database at the first switch; and
   determining, at the first switch, that the first data packet includes the first reconfigured address.

4. The method of claim 1, wherein the first data packet originates from a second device, the second device is located on a regional network, the regional network is communicatively coupled to the local network, the method further comprising facilitating transmission of the first data packet from the second device on the regional network to the device on the local network.

5. The method of claim 1, wherein the second reconfigured address is generated and distributed in response to receiving notification that an attack on the local network has been detected.

6. The method of claim 5, wherein the attack notification is determined by a data analyzer, the data analyzer is located on a third switch, wherein the third switch is configured to route the second data packet from the second device to the device.

7. The method of claim 6, wherein the data analyzer utilizes a machine learning algorithm to determine whether the second data packet includes expected data or unexpected data, wherein the unexpected data comprises the attack on the local network, or whether a behavior on the host device is normal or anomalous.

8. The method of claim 1,
wherein the first data packet is routed to the device via a first route in the local network, and the second data packet is routed to the device via a second route in the local network, wherein the first route and the second route are different.

9. A non-transitory computer-readable storage medium comprising instructions that, when executed by a processor, cause the processor to perform acts comprising:
repeatedly reconfiguring addresses of a plurality of devices on a local area network, wherein reconfiguring an address for a device on the local area network comprises:
generating a pair of addresses for the device on the local area network, wherein the pair of addresses comprises an original device address of the device and a first reconfigured device address, wherein the first reconfigured address is randomly generated;
distributing the pair of addresses to a switch on the local area network to facilitate routing of a first data packet to the device, wherein the original device address in the first data packet has been replaced with the first reconfigured device address, wherein the first reconfigured address is generated and distributed to the switch to dynamically alter the address of the device on the local network, and further wherein the first reconfigured address is generated and distributed in accordance with one of a schedule having a defined configuration timing or a schedule having a random configuration timing;
receiving, at the switch, the first data packet having the first reconfigurable address;
identifying, at the switch, the original device address of the device based upon the first reconfigurable address in the first data packet;
at the switch, responsive to identifying the original device address of the device, routing the first data packet to the device based upon the original device address of the device;
subsequent to generating the pair of addresses, generating a second reconfigured device address for the device on the local area network, wherein the second reconfigured address is randomly generated, the second reconfigured address being different from the first reconfigured address; and
distributing the second reconfigured device address to the switch on the local network to facilitate routing of a second data packet to the device, wherein the original device address in the second data packet has been replaced with the second reconfigured address;
receiving, at the switch, the second data packet having the second reconfigurable address;
identifying, at the switch, the original device address of the device based upon the second reconfigurable address in the second data packet; and
at the switch, responsive to identifying the original device address of the device, routing the second data packet to the device based upon the original device address of the device.

10. The computer-readable storage medium of claim 9, wherein the local area network is an industrial control network.

11. A system comprising:
a configuration component configured to repeatedly reconfigure addresses of devices on a local network, wherein repeatedly reconfiguring an address of a device on the local network comprises:
generating a first pair of addresses for the device on the local network, wherein the first pair of addresses comprises an original address of the device and a first reconfigured address, wherein the first reconfigured address is randomly generated;
distributing the first pair of addresses to a first switch on the local network to facilitate routing of a first data packet to the device, wherein the original device address in the first data packet has been replaced with the first reconfigured address, wherein the first reconfigured address is generated and distributed to the first switch to dynamically alter the address of the device on the local network, and further wherein the first reconfigured address is generated and distributed in accordance with one of a schedule having a defined configuration timing or a schedule having a random configuration timing;
receiving, at the first switch, the first data packet having the first reconfigurable address;
identifying, at the first switch, the original device address of the device based upon the first reconfigurable address in the first data packet;
at the first switch, responsive to identifying the original device address of the device, routing the first data packet to the device based upon the original device address of the device;
generating a second pair of addresses for the device on the local network, wherein the second pair of addresses comprises the original address of the device and a second reconfigured address, wherein the second reconfigured address is randomly generated; and
distributing the second pair of addresses to a second switch on the local network to facilitate routing of a second data packet to the device, wherein the original device address in the second data packet has been replaced with the second reconfigured address, the second reconfigured address being different from the first reconfigured address;
receiving, at the second switch, the second data packet having the second reconfigurable address;
identifying, at the second switch, the original device address of the device based upon the second reconfigurable address in the second data packet; and
at the second switch, responsive to identifying the original device address of the device, routing the second data packet to the device based upon the original device address of the device.

12. The system of claim 11, wherein the local network is an industrial control network.

13. The system of claim 11, wherein repeatedly reconfiguring the address of the device on the local network further comprises:
storing the first pair of addresses in a local database at the first switch; and determining, at the first switch, that the first data packet includes the first reconfigured address.

14. The system of claim 11, wherein the first data packet originates from a second device, the second device is located on a regional network, the regional network is communicatively coupled to the local network, the method further comprising facilitating transmission of the first data packet from the second device on the regional network to the device on the local network.

15. The system of claim 11, wherein the second reconfigured address is generated and distributed in response to receiving a notification that an attack on the local network has been detected.

16. The system of claim 15, further comprising a data analyzer that identifies the attack and generates the attack notification, the data analyzer is located on a third switch, wherein the third switch is configured to route the second data packet from the second device to the device.

17. The system of claim 16, wherein the data analyzer utilizes a machine learning algorithm to determine whether the second data packet includes expected data or unexpected data, wherein the unexpected data comprises the attack on the local network, or whether a behavior on the host device is normal or anomalous.

18. The system of claim 11, wherein the first data packet is routed to the device via a first route in the local network, and the second data packet is routed to the device via a second route in the local network, wherein the first route and the second route are different.

* * * * *